(12) United States Patent
Kwak et al.

(10) Patent No.: US 9,626,930 B2
(45) Date of Patent: Apr. 18, 2017

(54) DISPLAY DEVICE

(71) Applicant: Samsung Display Co., Ltd., Yongin, Gyeonggi-Do (KR)

(72) Inventors: Yun Hee Kwak, Hwaseong-si (KR); Jong Woong Jang, Asan-si (KR)

(73) Assignee: SAMSUNG DISPLAY CO., LTD., Yongin (KR)

( * ) Notice: Subject to any disclaimer, the term of this patent is extended or adjusted under 35 U.S.C. 154(b) by 275 days.

(21) Appl. No.: 13/748,845

(22) Filed: Jan. 24, 2013

(65) Prior Publication Data

US 2013/0307761 A1 Nov. 21, 2013

(30) Foreign Application Priority Data

May 16, 2012 (KR) .................. 10-2012-0052164

(51) Int. Cl.
    *G09G 3/36* (2006.01)
    *H05B 37/02* (2006.01)
    *G02F 1/1345* (2006.01)

(52) U.S. Cl.
    CPC ....... *G09G 3/3696* (2013.01); *G02F 1/13452* (2013.01); *H05B 37/02* (2013.01)

(58) Field of Classification Search
    CPC ............. G09G 3/36; G09G 2300/0434; G09G 2300/0439; G09G 2300/0443; G09G 2300/0447; G09G 2300/0452; G09G 2300/0456; G09G 2300/046; G09G 2300/0465; G09G 2300/0469; G09G 2300/0473; G09G 2300/0478; G09G 2300/0482; G09G 2300/048; G09G 2300/0486; H05B 37/02

USPC .............................. 345/87, 204, 102; 349/56
See application file for complete search history.

(56) References Cited

U.S. PATENT DOCUMENTS

| | | | | |
|---|---|---|---|---|
| 5,576,868 | A | * | 11/1996 | Togashi ................... 349/149 |
| 5,742,074 | A | * | 4/1998 | Takizawa et al. .......... 257/59 |
| 5,777,610 | A | * | 7/1998 | Sugimoto et al. ......... 345/206 |
| 5,831,605 | A | * | 11/1998 | Yasui et al. ............... 345/211 |
| 6,229,510 | B1 | * | 5/2001 | Kim et al. ................... 345/87 |

(Continued)

FOREIGN PATENT DOCUMENTS

| | | |
|---|---|---|
| CN | 101320550 | 12/2008 |
| CN | 101661723 | 3/2010 |

(Continued)

*Primary Examiner* — Grant Sitta
(74) *Attorney, Agent, or Firm* — Cantor Colburn LLP

(57) ABSTRACT

A display device includes: a first display panel including: a display area including a first edge, a second edge and a third edge, where the first and second edges are disposed opposite to each other, and the third edge is connected to the first and second edges, a peripheral area around the display area, and a plurality of pixels disposed in the display area; a first common voltage transmitting line extending along the third edge, where the first common voltage transmitting line transmits a first common voltage to the display area through a plurality of input points sequentially disposed along the third edge; and a second common voltage transmitting line extending along the third edge, where the second common voltage transmitting line transmits a second common voltage to the display area through a supplementary input point, which is adjacent to the second edge or the third edge.

21 Claims, 41 Drawing Sheets

(56) References Cited

U.S. PATENT DOCUMENTS

| | | | |
|---|---|---|---|
| 6,392,626 B1* | 5/2002 | Moon | 345/94 |
| 6,686,987 B1* | 2/2004 | Sakaki et al. | 349/149 |
| 6,714,182 B2* | 3/2004 | Hong | 345/95 |
| 6,864,941 B2* | 3/2005 | Yano | 349/149 |
| 6,914,586 B2* | 7/2005 | Burkhardt | 345/87 |
| 6,917,104 B2* | 7/2005 | Hashimoto | 257/734 |
| 6,937,313 B2* | 8/2005 | Park et al. | 349/149 |
| 6,963,385 B2* | 11/2005 | Aruga et al. | 349/151 |
| 6,970,225 B2* | 11/2005 | Tanaka et al. | 349/147 |
| 7,002,658 B2* | 2/2006 | Komeno et al. | 349/149 |
| 7,002,812 B2* | 2/2006 | Sakaki | 361/803 |
| 7,375,718 B2* | 5/2008 | Kim | 345/100 |
| 7,652,649 B2* | 1/2010 | Huang | 345/90 |
| 8,054,272 B2 | 11/2011 | Lee et al. | |
| 8,106,869 B2* | 1/2012 | Feng | 345/92 |
| 8,416,164 B2* | 4/2013 | Hwang et al. | 345/87 |
| 8,736,538 B2* | 5/2014 | Al-Dahle | 345/100 |
| 2005/0156840 A1 | 7/2005 | Kim et al. | |
| 2007/0152943 A1* | 7/2007 | Hwang | G02F 1/13306 345/98 |
| 2008/0165301 A1* | 7/2008 | Chang et al. | 349/40 |
| 2009/0128536 A1* | 5/2009 | Seo | G09G 3/3655 345/211 |
| 2009/0323005 A1 | 12/2009 | Ota | |
| 2010/0045912 A1* | 2/2010 | Chen | G02F 1/13394 349/122 |
| 2010/0053056 A1* | 3/2010 | Lee et al. | 345/94 |
| 2010/0060558 A1 | 3/2010 | Kim et al. | |
| 2010/0201669 A1 | 8/2010 | Kim et al. | |
| 2011/0074705 A1* | 3/2011 | Yousefpor et al. | 345/173 |
| 2011/0085105 A1* | 4/2011 | Park | G02F 1/1333 349/54 |
| 2011/0187677 A1* | 8/2011 | Hotelling et al. | 345/174 |
| 2012/0092273 A1* | 4/2012 | Lyon et al. | 345/173 |
| 2012/0153310 A1* | 6/2012 | Kwak | G02F 1/134363 257/88 |
| 2012/0162090 A1* | 6/2012 | Chang et al. | 345/173 |
| 2013/0249880 A1* | 9/2013 | Chen et al. | 345/211 |
| 2014/0184964 A1* | 7/2014 | Byeon et al. | 349/33 |

FOREIGN PATENT DOCUMENTS

| | | |
|---|---|---|
| EP | 2259172 | 12/2010 |
| JP | 63175890 | 7/1988 |
| JP | 2003098536 | 4/2003 |
| JP | 2003167269 | 6/2003 |
| JP | 2007322580 | 12/2007 |
| JP | 2008015464 | 1/2008 |
| JP | 2009128914 | 6/2009 |
| JP | 2009282332 A | 12/2009 |
| KR | 1020040090082 A | 10/2004 |
| KR | 1020080003036 A | 1/2008 |
| KR | 1020080061120 A | 7/2008 |
| KR | 1020080070444 A | 7/2008 |
| KR | 100992127 | 10/2010 |
| WO | 2007135893 | 5/2007 |

* cited by examiner

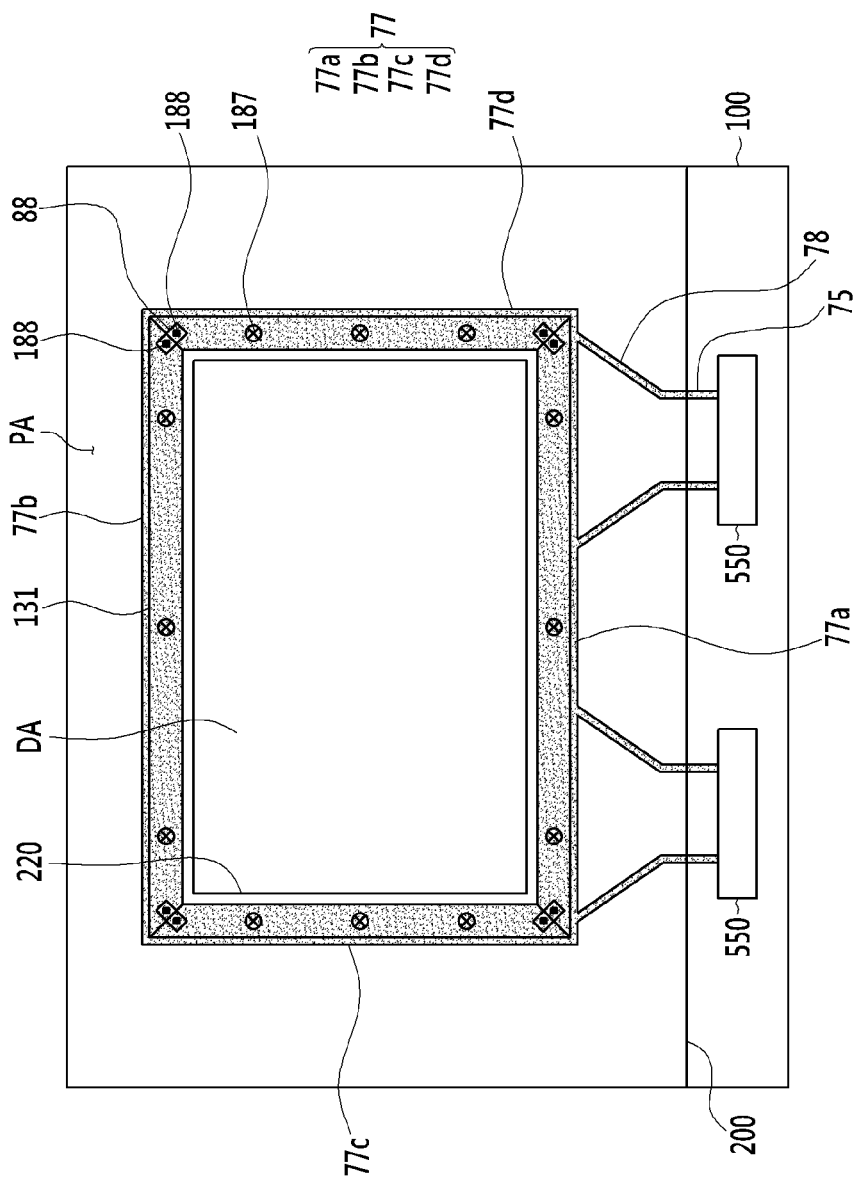

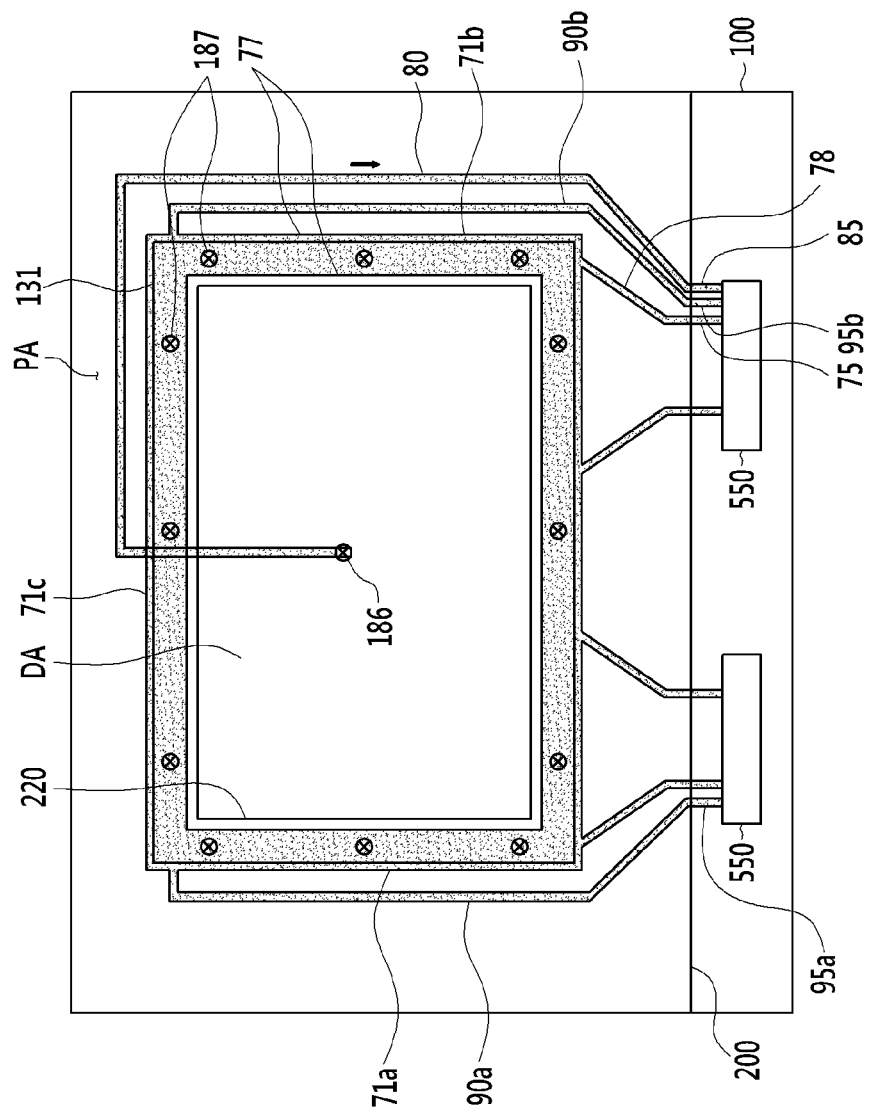

DISPLAY DEVICE

This application claims priority to Korean Patent Application No. 10-2012-0052164 filed on May 16, 2012, and all the benefits accruing therefrom under 35 U.S.C. §119, the content of which in its entirety is herein incorporated by reference.

BACKGROUND (a) Field

Exemplary embodiment of the invention relate to a display device, and more particularly, to a display device including a common voltage line.

(b) Description of the Related Art

Most widely used types of display devices typically include a liquid crystal display, an organic light emitting display, an electrophoretic display and the like.

The display device includes a plurality of pixels and a plurality of display signal lines. Each pixel includes a switching element and a pixel electrode connected to the switching element, and the switching element is connected to the display signal lines. The display signal line includes a gate line for transmitting a gate signal and a data line for transmitting a data voltage. The pixel electrode receives the data voltage through the switching element turned on by the gate signal. The switching element may be a three-terminal element such as a thin film transistor. The pixel electrode, the switching element and the like may be positioned in a thin film transistor array panel.

The liquid crystal display, which is one of the most widely used type of flat panel, typically includes two display panels with field generating electrodes such as a pixel electrode and a common electrode and a liquid crystal layer interposed between the two display panels. The liquid crystal display generates an electric field in the liquid crystal layer by applying voltages to the field generating electrodes, and determines the direction of liquid crystal molecules of the liquid crystal layer by the generated electric field, thereby controlling polarization of incident light to display images.

The display panel included in the display device may include a common signal line for transmitting a common voltage and the like or a common electrode. The common voltage may also be directly applied to the common electrode from an edge of the display panel and may also be applied to the common electrode through the common signal line. Since an image displayed by each pixel varies based on a difference between the data voltage and the common voltage, magnitudes of the common voltages applied to pixels which are distributed over the entire display panel may be substantially constant. However, the magnitude of the common voltage may not be substantially uniform according to a position in the display panel due to loads depending on resistance of a wire or electrode that transmits the common voltage or a parasite capacitance, and thus a display defect may occur.

SUMMARY

Provided is a display device having reduced deviation of a common voltage applied to a display panel according to positions in the display panel and having reduced display defect.

An exemplary embodiment of the invention provides a display device including: a first display panel including: a display area including a first edge, a second edge and a third edge, where the first and second edges are disposed opposite to each other, and the third edge is connected to the first and second edges, a peripheral area around the display area, and a plurality of pixels disposed in the display area; a first common voltage transmitting line extending along the third edge, where the first common voltage transmitting line transmits a first common voltage to the display area through a plurality of input points sequentially disposed along the third edge; and a second common voltage transmitting line extending along the third edge, where the second common voltage transmitting line transmits a second common voltage to the display area through a supplementary input point, which is adjacent to the second edge or the third edge, in which an input pad of the first common voltage transmitting line and an input pad of the second common voltage transmitting line are disposed in the peripheral area adjacent to the first edge and separated from each other, and the supplementary input point is closer to a last input point of the plurality of input points, which is closest to the second edge, than the first input point of the plurality of input points, which is closest to the first edge.

In an exemplary embodiment, the display device may further include a common voltage feedback line extending along the third edge, where the common voltage feedback line receives a voltage of the last input point or a voltage of an end of the first common voltage transmitting line and transmits the received voltage to an output pad thereof as a feedback voltage.

In an exemplary embodiment, the display device may further include a signal controller which generates the first common voltage and the second common voltage based on the feedback voltage.

In an exemplary embodiment, the common voltage feedback line may be connected to an end of the first common voltage transmitting line disposed around the second edge.

In an exemplary embodiment, a line width of the second common voltage transmitting line may be larger than a line width of the first common voltage transmitting line.

In an exemplary embodiment, a pixel of the plurality of pixels may include an insulation substrate, a common voltage line disposed on the insulation substrate, a common electrode connected to the common voltage line, a pixel electrode overlapping the common electrode, and an insulating layer interposed between the pixel electrode and the common electrode, in which the first common voltage transmitting line may be connected to at least one of the common voltage line and the common electrode through the plurality of input points.

In an exemplary embodiment, the supplementary input point may be disposed in the peripheral area adjacent to the third edge, and the first common voltage transmitting line and the second common voltage transmitting line may be connected to each other at the supplementary input point.

In an exemplary embodiment, the supplementary input point may be substantially arranged with the last input point.

In an exemplary embodiment, the second common voltage transmitting line transmits the second common voltage to the display area through a plurality of supplementary input points, which are adjacent to the second edge and arranged along the second edge.

In an exemplary embodiment, the common voltage line may extend in a direction substantially vertical to the second edge.

In an exemplary embodiment, the first common voltage transmitting line and the second common voltage transmitting line may be disposed in different layers.

In an exemplary embodiment, the display device may further include a second display panel disposed opposite to the first display panel, and a liquid crystal layer interposed between the first display panel and the second display panel, in which the common electrode may be disposed between the pixel electrode and the liquid crystal layer, the common electrode may include a plurality of branch electrodes overlapping the pixel electrode, and the first common voltage transmitting line and the second common voltage transmitting line may be connected to each other through a contact assistant disposed in a layer, in which the common electrode is disposed.

In an exemplary embodiment, the display device may further include a second display panel disposed opposite to the first display panel with a liquid crystal layer interposed between the first display panel and the second display panel, in which the pixel electrode may be disposed between the common electrode and the liquid crystal layer, the pixel electrode may include a plurality of branch electrodes overlapping the common electrode, and the first common voltage transmitting line and the second common voltage transmitting line may be connected to each other through a contact assistant disposed in a layer, in which the pixel electrode is disposed.

In an exemplary embodiment, the display device may further include a plurality of gate lines disposed in the display area; and a gate driver which transmits gate signals to the plurality of gate lines, in which the first common voltage transmitting line and the second common voltage transmitting line may be disposed in a different layer from the gate line.

Another exemplary embodiment of the invention provides a display device including: a first substrate including a display area, a peripheral area around the display area, and a plurality of pixels disposed in the display area; a common electrode disposed in substantially an entire area of the display area; and a first common voltage transmitting line disposed along at least three edges of the display area, where the first common voltage transmitting line transmits a first common voltage to the common electrode through a plurality of first input points, which are disposed along the at least three edges.

In an exemplary embodiment, the display device may further include a second common voltage transmitting line which transmits a second common voltage received from an input pad positioned in the peripheral area to the common electrode through a supplementary input point disposed in the display area.

In an exemplary embodiment, the display device may further include a common voltage feedback line which transmits a voltage of the common electrode as a feedback voltage to an output pad disposed in the peripheral area through a feedback output point disposed in the display area.

In an exemplary embodiment, the common voltage feedback line and the second common voltage transmitting line may be disposed in a same layer.

In an exemplary embodiment, the first common voltage transmitting line may be disposed in a same layer as the common voltage feedback line and the second common voltage transmitting line.

In an exemplary embodiment, the first common voltage transmitting line may be divided into at least two portions by a cutout, and at least one of the common voltage feedback line and the second common voltage transmitting line may extend to the display area through the cutout.

In an exemplary embodiment, the first common voltage transmitting line may be disposed in a different layer from at least one of the common voltage feedback line and the second common voltage transmitting line.

In an exemplary embodiment, the display device may further include a protrusion connected to the first common voltage transmitting line and extending into the display area, in which the protrusion may transmit the first common voltage to the common electrode in the display area through a second input point.

In an exemplary embodiment, the display device may further include a second common voltage transmitting line extending along the first common voltage transmitting line in the peripheral area, in which the second common voltage transmitting line may transmit a second common voltage which compensates a deviation of common voltage according to a position in the common electrode to the first common voltage transmitting line.

In an exemplary embodiment, when an input pad of the first common voltage transmitting line is disposed in a first side with respect to a horizontal center line of the display area, the second common voltage transmitting line may be connected to a portion of the first common voltage transmitting line, which is positioned in a second side opposite to the first side with respect to the horizontal center line.

According to one or more exemplary embodiments of the invention, a display defect is substantially reduced by reducing a deviation of a common voltage applied to a display panel of the display device according to positions in the display panel.

BRIEF DESCRIPTION OF THE DRAWINGS

The above and other features of the invention will become more apparent by describing in further detail exemplary embodiments thereof with reference to the accompanying drawings, in which:

FIGS. 23A, 23B and 23C are block diagrams showing exemplary embodiments of a display device according to the invention;

FIGS. 35, 36, 37, 38 and 39 are block diagrams showing alternative exemplary embodiments of a display device according to the invention.

DETAILED DESCRIPTION

Figure 1:
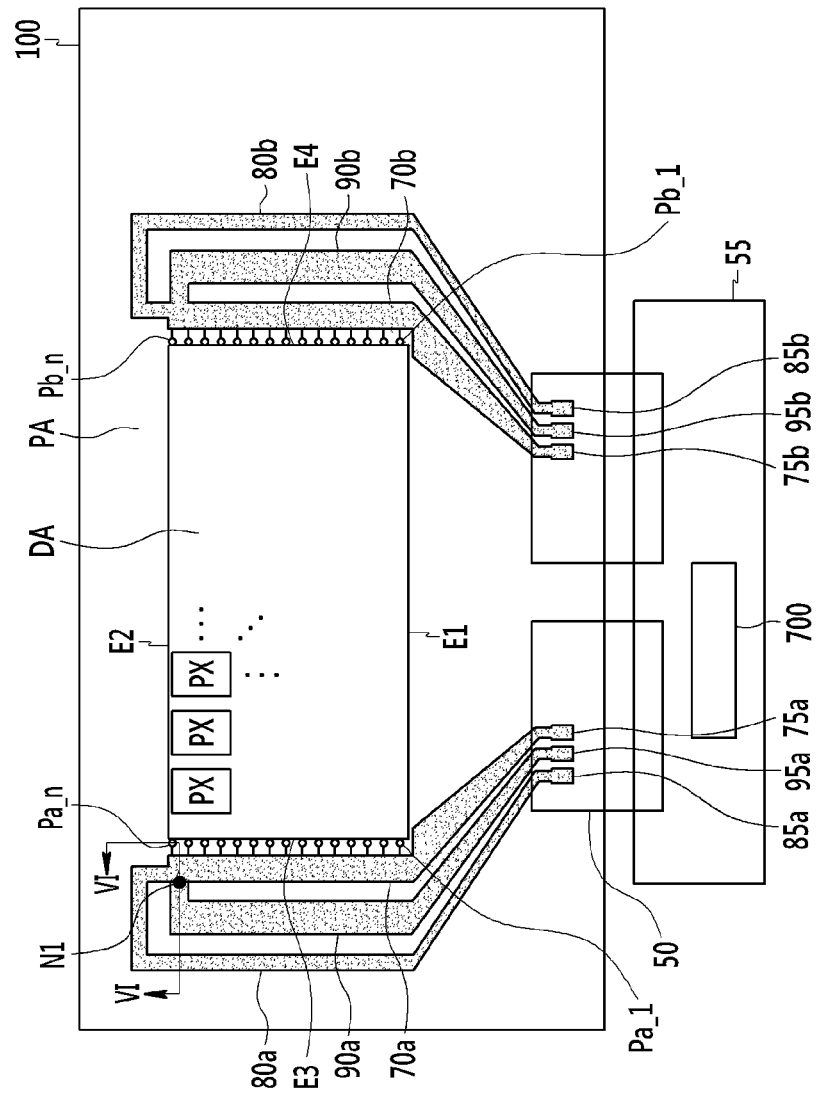
FIG. 1 is a block diagram showing an exemplary embodiment of a display device according to the invention.

The invention will be described more fully hereinafter with reference to the accompanying drawings, in which exemplary embodiments of the invention are shown.

This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

First, a display device according to an exemplary embodiment of the invention will be described with reference to FIGS. 1, 2 and 3.

Figure 2:
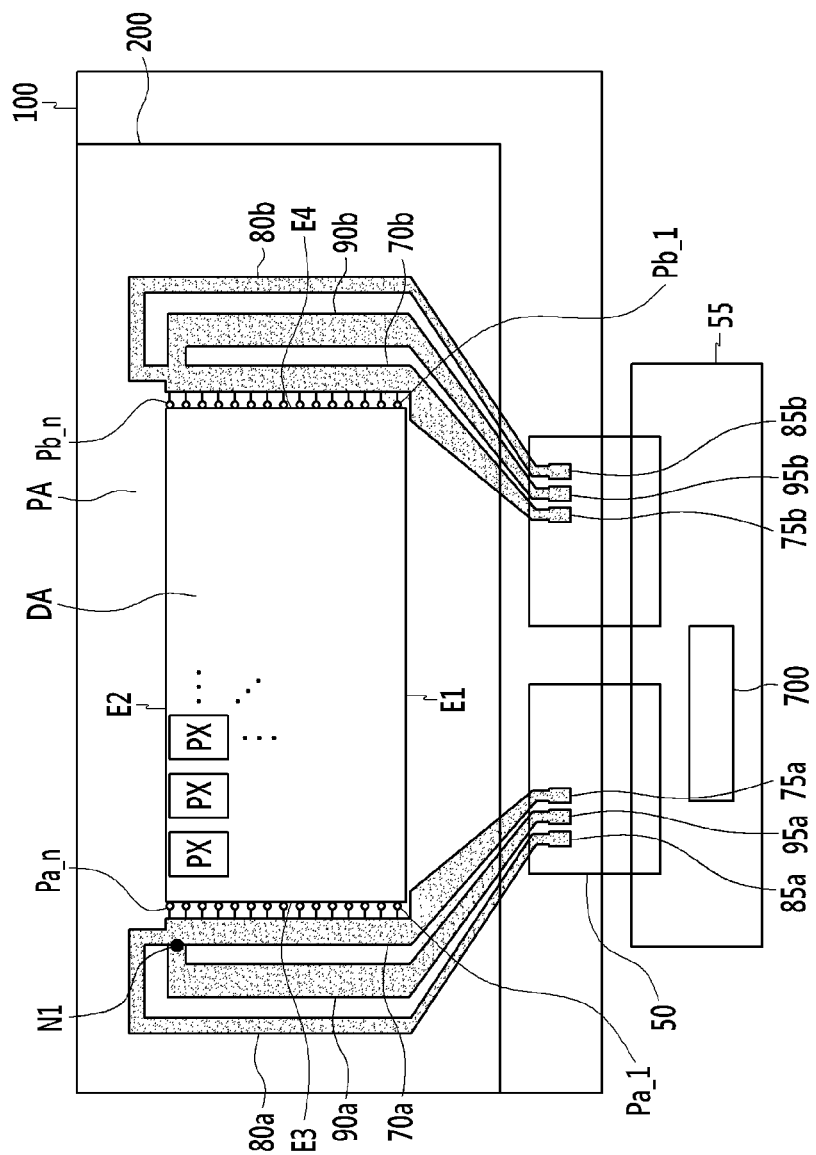
FIG. 2 is block diagram showing an alternative exemplary embodiment of the display device according to the invention.
Figure 3:
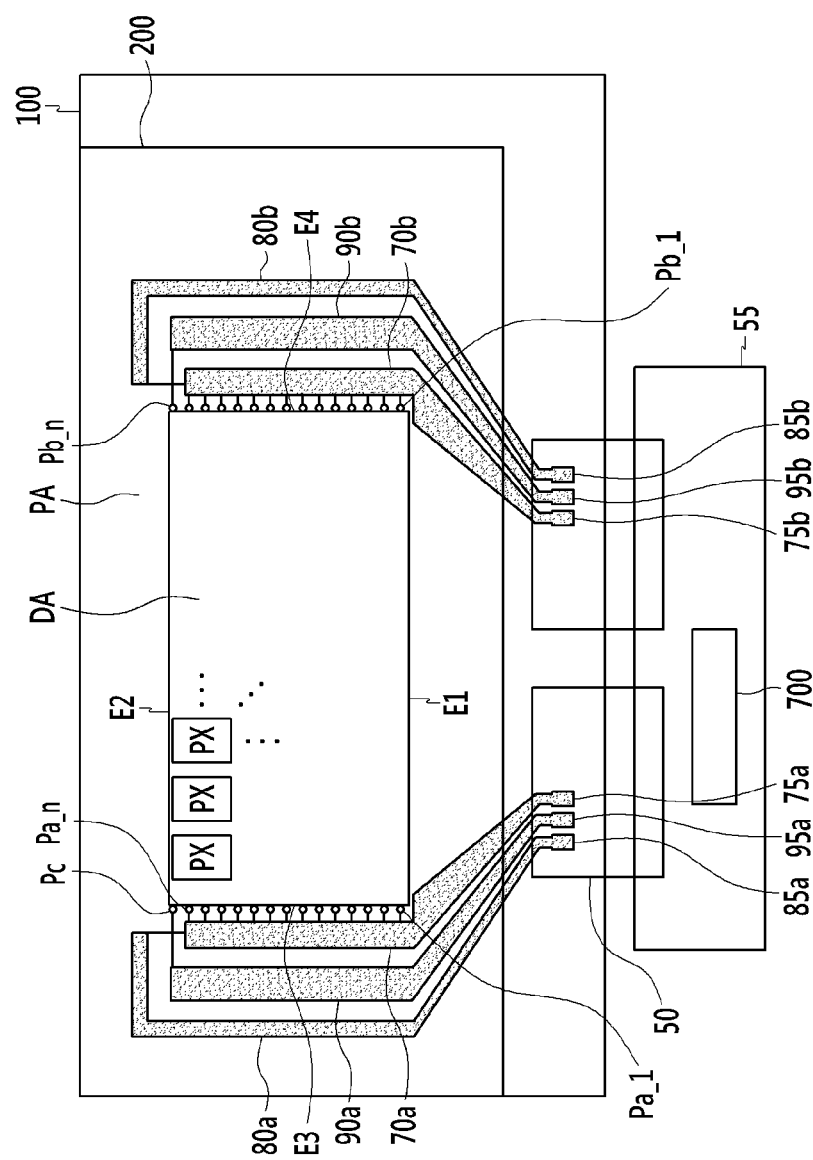
FIG. 3 is a block diagram showing another alternative exemplary embodiment of the display device according to the invention.

FIGS. 1, 2 and 3 are block diagrams showing an exemplary embodiment of the display device according to the invention.

Referring to FIGS. 1 to 3, an exemplary embodiment of the display device includes a first display panel 100 including a display area DA, on which an image is displayed, and a peripheral area PA surrounding the display area DA.

Referring to FIGS. 2 and 3, an exemplary embodiment of the display device may include a second display panel 200 disposed opposite to, e.g., facing, the first display panel 100. In an exemplary embodiment, where the display device is a liquid crystal display, a liquid crystal layer (not shown) may be further included between the first display panel 100 and the second display panel 200. In such an embodiment, the first display panel 100 and the second display panel 200 are coupled to each other, and a part of the peripheral area PA of the first display panel 100 may not be covered by the second display panel 200 to be exposed.

In an exemplary embodiment, a plurality of driving signal lines and a plurality of pixels PX are connected thereto and arranged substantially in a matrix form in the display area DA of the first display panel 100.

The driving signal lines are provided on the first display panel 100, and include a plurality of gate lines (not shown) for transmitting gate signals (referred to as "scanning signals") and a plurality of data lines (not shown) for transmitting data voltages. In such an embodiment, a common voltage line (not shown) for transmitting a predetermined voltage such as common voltage or a common electrode (not shown) may be formed in the first display panel 100 or the second display panel 200.

Each of the pixels PX may include a switching element such as a thin film transistor connected to the driving signal line, a pixel electrode (not shown) connected thereto, and a common electrode (or, referred to as an opposed electrode) that receives the common voltage.

In an exemplary embodiment, where the display device is an organic light emitting display, an emission layer is positioned between the pixel electrode and the common electrode to form a light emitting diode. In such an embodiment, the pixel electrode serves as an anode and the common electrode serves as a cathode, such that the emission layer emits light according to output current between the anode and the cathode to display an image.

In an exemplary embodiment, where the display device is the liquid crystal display, the pixel electrode and the common electrode, which may be positioned in a same panel, e.g., the first display panel 100 or positioned in two different panels, e.g., the first and second display panels 100 and 200, respectively, are positioned with the liquid crystal layer therebetween to generate an electric field in the liquid crystal layer. As described above, by generating the electric field in the liquid crystal layer, a direction of liquid crystal molecules of the liquid crystal layer between the pixel electrode and the common electrode is determined, thereby controlling luminance of light passing through the liquid crystal layer.

In an exemplary embodiment, each of the pixels PX uniquely displays one of primary colors (spatial division) or alternately displays the primary colors according to a time (temporal division) to implement a color display, such that a desired color is recognized by a spatial and temporal sum of the primary colors. In an exemplary embodiment, the primary colors may include three primary colors such as red, green and blue, for example, but not being limited thereto.

Referring to FIGS. 1 to 3, the display area DA may include a first edge E1 and a second edge E2 which face each other, and a third edge E3 and a fourth edge E4 which connect the first and second edges E1 and E2 and face each other. In an exemplary embodiment, as shown in FIG. 1, the display area DA may be in a substantially rectangular form, but the shape is not limited thereto.

In an exemplary embodiment, a signal input pad for inputting a driving signal such as a gate signal and a data signal to the driving signal line and a driver for applying a driving signal to the driving signal line may be positioned in the peripheral area PA of the first display panel 100.

In such an embodiment, a plurality of common voltage transmitting lines 70a, 70b, 90a and 90b for transmitting a common voltage to the display area DA are positioned in the peripheral area PA of the first display panel 100.

The common voltage transmitting lines 70a, 70b, 90a and 90b include first common voltage transmitting lines 70a and 70b and second common voltage transmitting lines 90a and 90b. In an exemplary embodiment, the first common voltage transmitting lines 70a and 70b and the second common voltage transmitting lines 90a and 90b may be positioned in the same layer when viewed in a cross-sectional view. In an alternative exemplary embodiment, the first common voltage transmitting lines 70a and 70b and the second common voltage transmitting lines 90a and 90b may be positioned in different layers when viewed in a cross-sectional view. In an exemplary embodiment, the first common voltage transmitting lines 70a and 70b may be positioned between the second common voltage transmitting lines 90a and 90b and an edge of the display area DA when viewed from a plan view, but the layout of the first common voltage transmitting lines 70a and 70b and the second common voltage transmitting lines 90a and 90b is not limited thereto.

The first common voltage transmitting lines 70a and 70b may extend along the third edge E3 or the fourth edge E4 toward the second edge E2 of the display area DA from input pads 75a and 75b positioned in the peripheral area PA adjacent to the first edge E1 of the display area DA. In an exemplary embodiment, as shown in FIGS. 1, 2 and 3, one of the first common voltage transmitting line 70a extends along the third edge E3, and another of the first common voltage transmitting line 70b extends along the fourth edge E4, but not being limited thereto. In an alternative exemplary embodiment, the first common voltage transmitting lines 70a and 70b may be disposed at a same side of the display area DA.

The first common voltage transmitting lines 70a and 70b input first common voltage to a common voltage line or a common electrode of the display area DA through a plurality of common voltage input points (hereinafter, referred to as "input points") Pa_1, . . . , Pa_n, Pb_1, . . . , Pb_n (n is a natural number equal to or greater than 2). The input points Pa_1, . . . , Pa_n, Pb_1, . . . , Pb_n may be positioned in a portion of the peripheral area PA, which is adjacent to the display area DA. In an alternative exemplary embodiment, input points Pa_1, . . . , Pa_n, Pb_1, . . . , Pb_n may be positioned in an edge of the display area DA.

Referring to FIGS. 1 to 3, the input points Pa_1, . . . , Pa_n, Pb_1, . . . , Pb_n may be sequentially arranged along the third edge E3 and/or the fourth edge E4 of the display area DA with a predetermined interval therebetween. For convenience of the description, the input points Pa_1 and Pb_1 closest to the input pads 75a and 75b will be referred to as first input points Pa_1 and Pb_1, and the input points Pa_n and Pb_n farthest away from the input pads 75a and 75b will be referred to as final input points Pa_n and Pb_n. In such an embodiment, a level of the first common voltage inputted from the input points Pa_1, . . . , Pa_n, Pb_1, . . . , Pb_n may vary according to a position due to different loads, such as resistance of the first common voltage transmitting lines 70a and 70b and the like. In such an embodiment, the voltage of the first common voltage inputted from the input points Pa_1, . . . , Pa_n, Pb_1, . . . , Pb_n may drop as being distant from the first edge E1. That is, the first common voltage inputted from the last input points Pa_n and Pb_n may be lower than the first common voltage inputted from the first input points Pa_1 and Pb_1.

The second common voltage transmitting lines 90a and 90b may extend along the third edge E3 or the fourth edge E4 toward the second edge E2 of the display area DA from input pads 95a and 95b, which are positioned near the first edge E1 of the display area DA. In an exemplary embodiment, as shown in FIGS. 1, 2 and 3, the second common voltage transmitting lines 90a and 90b extending along the third edge E3 and along the fourth edge E4 are provided at different sides of the display area DA, but not being limited thereto. In an alternative exemplary embodiment, the second common voltage transmitting lines 90a and 90b may be positioned at a same side of the display area DA.

The input pads 95a and 95b of the second common voltage transmitting lines 90a and 90b may be separated from the input pads 75a and 75b of the first common voltage transmitting lines 70a and 70b.

According to an exemplary embodiment, as shown in FIG. 3, the second common voltage transmitting lines 90a and 90b may input a second common voltage to the common voltage line of the display area DA or the common electrode through a supplementary common voltage input point (hereinafter, referred to as "supplementary input point") Pc which is adjacent to the third edge E3 of the display area DA. The supplementary input points Pc may be closer to the last input points Pa_n and Pb_n than the first input points Pa_1 and Pb_1. In an exemplary embodiment, as shown in FIG. 3, the supplementary input points Pc are positioned directly on the last input points Pa_n and Pb_n, but not being limited thereto.

In an alternative exemplary embodiment, the supplementary input points Pc may be positioned between the last input points Pa_n and Pb_n and input points Pa_(n−1) and Pb_(n−1) which are positioned directly therebelow. In an exemplary embodiment, the supplementary input points Pc and the last input points Pa_n and Pb_n may also be arranged substantially in a horizontal direction.

In an exemplary embodiment, the supplementary input points Pc may be positioned in the peripheral area PA adjacent to the display area DA, but not being limited thereto. In an alternative exemplary embodiment, the supplementary input points Pc may also be positioned at the edge of the display area DA.

According to an exemplary embodiment, as shown in FIGS. 1 and 2, the second common voltage transmitting lines 90a and 90b are connected to the first common voltage transmitting lines 70a and 70b at a contact point N1 to transmit the second common voltage to the first common voltage transmitting lines 70a and 70b and the display area DA.

The contact point N1 may be closer to the last input points Pa_n and Pb_n than the first input points Pa_1 and Pb_1. In an exemplary embodiment, as shown in FIG. 1, the contact point N1 may be positioned at a point between final input points Pa_n and Pb_n and the input points Pa_(n−1) and Pb_(n−1) positioned directly therebelow. In an exemplary embodiment, the contact point N1 may be arranged substantially in a horizontal direction together with the last input points Pa_n and Pb_n.

In such an embodiment, the second common voltage transmitting lines 90a and 90b connected with the first common voltage transmitting lines 70a and 70b at the contact point N1 are connected to the common electrode or the common voltage line of the display area DA through the last input point Pa_n or the input point Pa_(n−1) positioned directly therebelow such that the contact point N1 is substantially the same as the supplementary input point Pc described above. Hereinafter, the supplementary input points Pc and the contact point N1 will be collectively referred to as the supplementary input points Pc.

In an exemplary embodiment, the second common voltage transmitting lines 90a and 90b may supplement a deviation of the first common voltage inputted from the input points Pa_1, . . . , Pa_n, Pb_1, . . . , Pb_n by the first common voltage transmitting lines 70a and 70b.

In an exemplary embodiment, the first common voltage transmitting lines 70a and 70b input the first common voltage to the display area DA through the plurality of input points Pa_1, . . . , Pa_n, Pb_1, . . . , Pb_n along the third edge E3 of the display area DA such that the deviation of the common voltage may occur according to positions of the input points Pa_1, . . . , Pa_n, Pb_1, . . . , Pb_n due to factors such as a load therethrough and resistances of the first common voltage transmitting lines 70a and 70b. In such an embodiment, the first common voltage transmitted to the last input points Pa_n and Pb_n may be lower than the first common voltage transmitted to the first input points Pa_1 and Pb_1, by the first common voltage transmitting lines 70a and 70b. Accordingly, when a deviation between the first common voltage transmitted to the display area DA through the last input points Pa_n and Pb_n and the first common voltage transmitted to the display area DA through the first input points Pa_1 and Pb_1 occurs, and when an image is displayed using the first common voltage in which the deviation occurs, image quality is not uniform according to a position of the display area DA and thus irregular spots may occur in the image. In an exemplary embodiment, the second common voltage transmitting lines 90a and 90b may input to the display area DA through the contact point N1 or the supplementary input points Pc, the second common voltage substantially reduces or effectively prevents the deviation between the first common voltage transmitted through the first input points Pa_1 and Pb_1 and the first common voltage transmitted through the last input points Pa_n and Pb_n. Accordingly, a level of the first common voltage inputted from first common voltage transmitting lines 70a and 70b the through the first input points Pa_1 and Pb_1 may be substantially the same as a level of the second common voltage inputted from the second common voltage transmitting lines 90a and 90b through the contact point N1 or the supplementary input points Pc.

In such an embodiment, the contact point N1 or the supplementary input points Pc may be substantially arranged at the last input points Pa_n and Pb_n or positioned to be close thereto. The contact point N1 or the supplementary input points Pc may also be positioned between the second input points Pa_(n−1) and Pb_(n−1) from the last and the second edge E2.

In an exemplary embodiment, a line width of the second common voltage transmitting lines 90a and 90b may be larger than a line width of the first common voltage transmitting lines 70a and 70b. In such an embodiment, resistances of the second common voltage transmitting lines 90a and 90b may be less than resistances of the first common voltage transmitting lines 70a and 70b. In an exemplary embodiment, the second common voltage transmitting lines 90a and 90b may be configured to minimize the resistances thereof. In an exemplary embodiment, since a voltage drop due to the resistances of the second common voltage transmitting lines 90a and 90b is less than a voltage drop due to the resistance of the first common voltage transmitting lines 70a and 70b, a voltage level of the second common voltage inputted from the input pads 95a and 95b of the second common voltage transmitting lines 90a and 90b is greater by predetermined voltage than the voltage level of the first common voltage inputted from the input pads 75a and 75b of the first common voltage transmitting lines 70a and 70b. In such an embodiment, the predetermined voltage may vary according to various design elements, such as the size of the first display panel 100, and the configuration of the second common voltage transmitting lines 90a and 90b, e.g., the line widths, resistances, lengths and the like.

Referring to FIGS. 1, 2 and 3, in an exemplary embodiment, common voltage feedback lines 80a and 80b may be further provided in the peripheral area PA of the first display panel 100 of the display.

When viewed in a cross-sectional view, the common voltage feedback lines 80a and 80b may be positioned in the same layer as or in different layers from the first common voltage transmitting lines 70a and 70b or the second common voltage transmitting lines 90a and 90b. In an alternative exemplary embodiment, the distance between the common voltage feedback lines 80a and 80b and the first and second common voltage transmitting lines 70a, 70b, 90a and 90b may be greater than the distance therebetween in the exemplary embodiment shown in FIGS. 1 to 3, but not being limited thereto.

The common voltage feedback lines 80a and 80b may extend along the third edge E3 or the fourth edge E4 toward the second edge E2 of the display area DA from output pads 85a and 85b thereof, which are positioned in the peripheral area PA adjacent to the first edge E1 of the display area DA. In an exemplary embodiment, as shown in FIGS. 1, 2 and 3, the common voltage feedback line 80a is extending along the third edge E3, and the common voltage feedback line 80b is extending along the fourth edge E4, but not being limited thereto. In an alternative exemplary embodiment, the common voltage feedback lines 80a and 80b may be positioned at a same side of the display area DA.

In an exemplary embodiment, the common voltage feedback lines 80a and 80b receive feedback of the common voltage from the last input points Pa_n and Pb_n of the first common voltage transmitting lines 70a and 70b or ends of the first common voltage transmitting lines 70a and 70b to transmit the fed-back common voltage to the output pads 85a and 85b as feedback voltage. In such an embodiment, the common voltage feedback lines 80a and 80b are directly connected with the last input points Pa_n and Pb_n or may also be connected with the ends of the first common voltage transmitting lines 70a and 70b, which are substantially close to the last input points Pa_n and Pb_n.

In an exemplary embodiment of the invention, the first common voltage and the second common voltage may be determined based on the feedback voltage transmitted by the common voltage feedback lines 80a and 80b.

In an exemplary embodiment, as shown in FIGS. 2 and 3, the input pads 75a, 75b, 95a and 95b and the output pads 85a and 85b may not be covered by the second display panel 200 to be exposed.

Referring to FIGS. 1 and 2, an exemplary embodiment of the display device according to the invention may further include a signal controller 700. The signal controller 700 may transmit the first common voltage to the first common voltage transmitting lines 70a and 70b through the input pads thereof 75a and 75b and transmit the second common voltage to the second common voltage transmitting lines 90a and 90b through the input pads thereof 95a and 95b. In such an embodiment, the signal controller 700 receives the feedback voltage from the common voltage feedback lines 80a and 80b to determine the first common voltage and the second common voltage based thereon.

In an exemplary embodiment, the signal controller 700 may be disposed on the first display panel 100, e.g., directly mounted in an integrated circuit ("IC") chip form. In an alternative exemplary embodiment, the signal controller 700 may be mounted on a flexible printed circuit film 50 to be adhered to the first display panel 100. In another alternative exemplary embodiment, as show in FIGS. 1 and 2, the signal controller 700 may also be mounted on a printed circuit board 55 and connected to the input pads 75a, 75b, 95a and 95b and the output pads 85a and 85b through the flexible printed circuit film 50.

Hereinafter, an exemplary embodiment of a display device according to the invention will be described in detail with reference to FIGS. 4 to 7 together with FIGS. 1 to 3.

Figure 4:
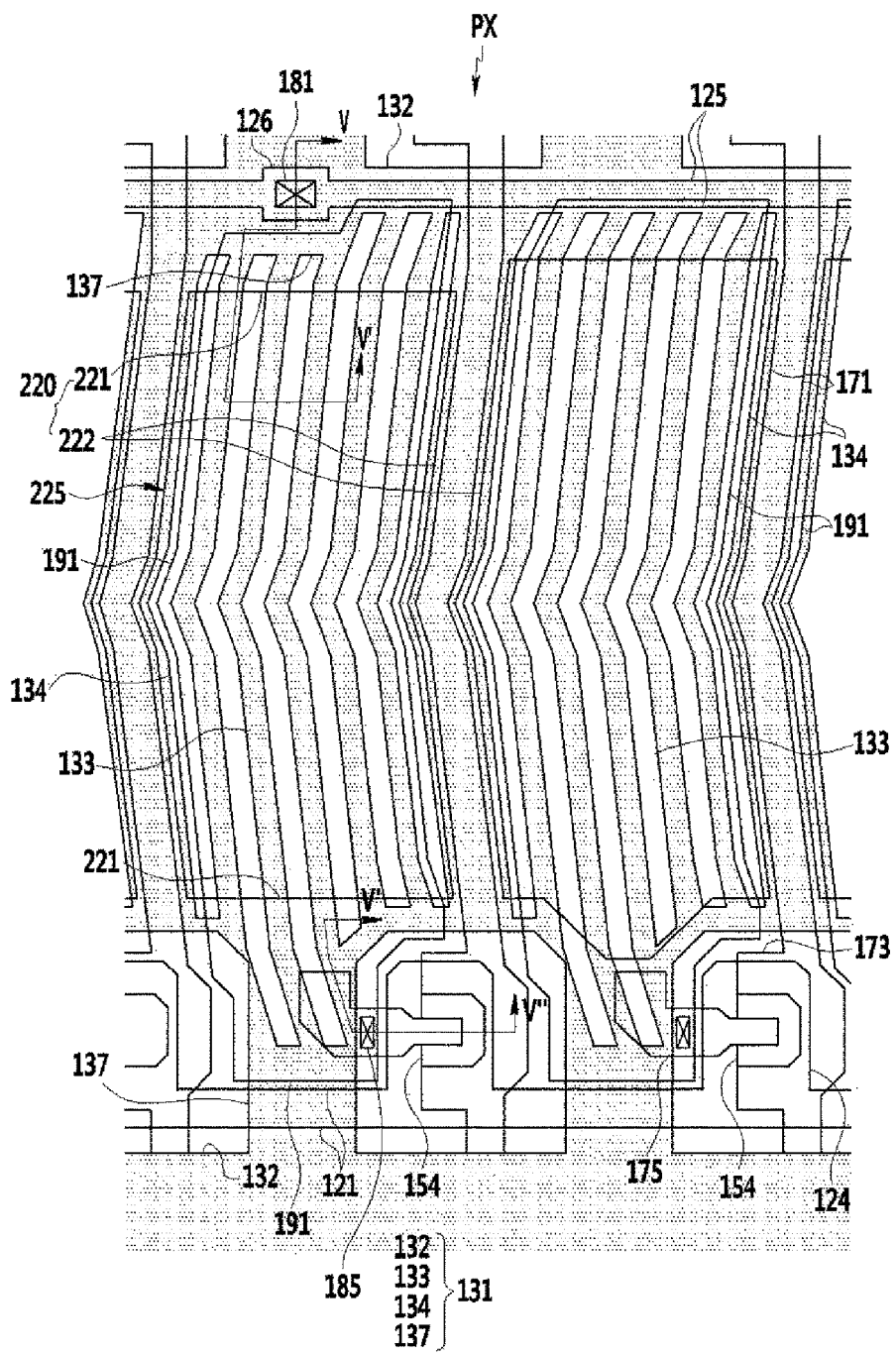
FIG. 4 is a top plan view of two pixels of an exemplary embodiment of a display device according to the invention.
Figure 5:
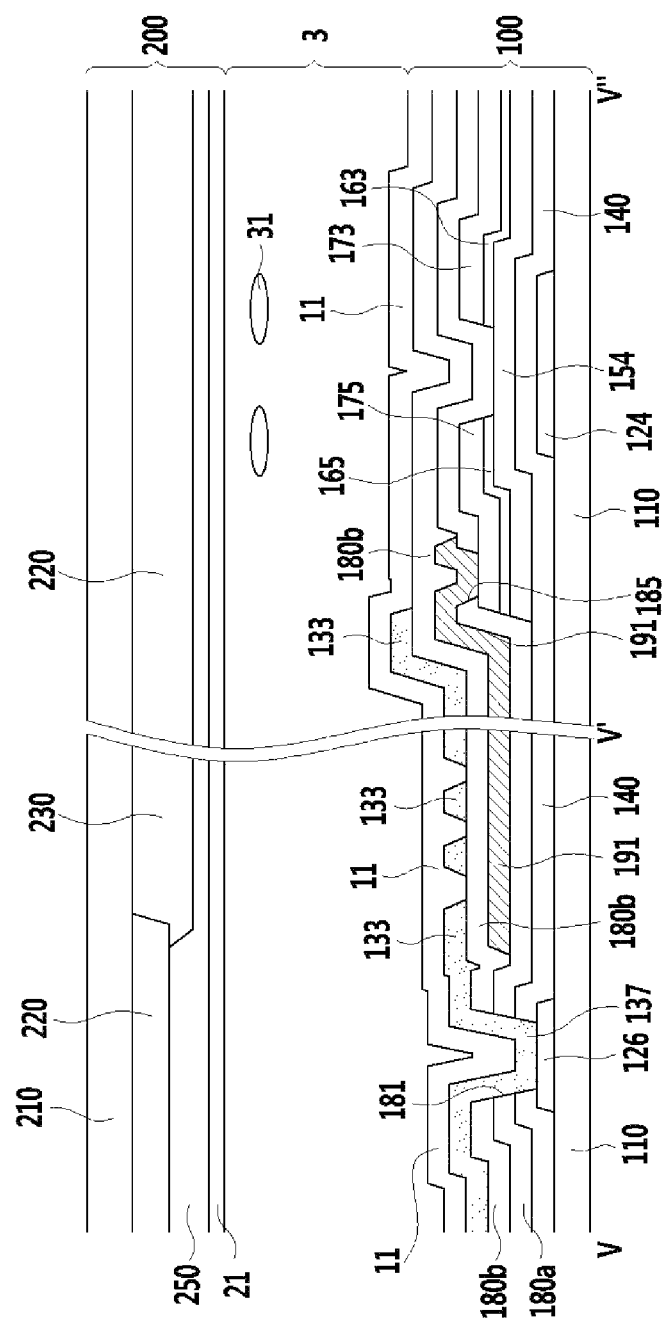
FIG. 5 is a cross-sectional view taken along line V-V'-V" of the display device of FIG. 4.
Figure 6:
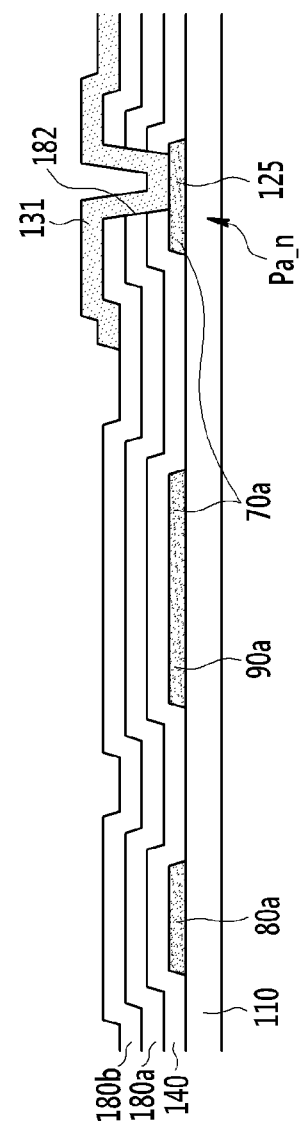
FIG. 6 is a cross-sectional view taken along line VI-VI of the display device of FIG. 1.
Figure 7:
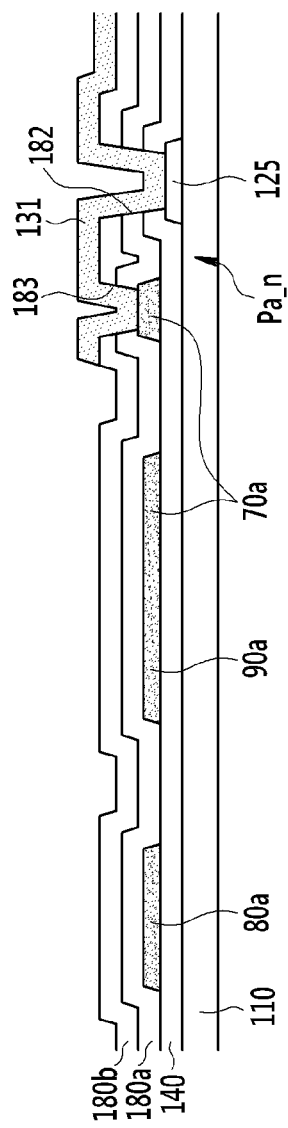
FIG. 7 is another cross-sectional view taken along line VI-VI of the display device of FIG. 1.

FIG. 4 is a top plan view of two pixels of an exemplary embodiment of a display device according to the invention, FIG. 5 is a cross-sectional view taken along line V-V'-V" of the display device of FIG. 4, FIG. 6 is a cross-sectional view taken along line VI-VI of the display device of FIG. 1, and FIG. 7 is another cross-sectional view taken along line VI-VI of the display device of FIG. 1.

First, referring to FIGS. 4 and 5, an exemplary embodiment of the display device according to an the invention is a liquid crystal display and includes a first display panel 100 and a second display panel 200 opposite to each other and a liquid crystal layer 3 interposed between the first and second display panels 100 and 200.

In an exemplary embodiment, the second display panel 200 includes an insulation substrate 210, and a light blocking member 220 and a color filter 230 disposed on the insulation substrate 210.

The light blocking member 220 may include a plurality of the first light blocking units 221 extending substantially in a horizontal direction and a plurality of the second light blocking units 222 extending substantially in a vertical direction. The first light blocking units 221 and the second light blocking units 222 may define an opening region 225 through which light is transmitted.

The color filter 230 may be disposed substantially in a region surrounded by the light blocking member 220, that is, the opening region 225, and may display one of primary colors, such as three primary colors of red, green and blue, for example.

The second display panel 200 may further include an overcoat 250 disposed on the light blocking member 220 and the color filter 230.

In an alternative exemplary embodiment, at least one of the light blocking member 220 and the color filter 230 may be disposed in the first display panel 100.

The liquid crystal layer 3 interposed between the first display panel 100 and the second display panel 200 includes liquid crystal molecules 31, and a longitudinal axis of the liquid crystal molecules 31 may be aligned substantially horizontal to the surfaces of the first and second display panel 100 and 200 when an electric field is not generated therebetween.

In an exemplary embodiment, alignment layers 11 and 21 are coated on the inner surfaces of the first and second display panels 100 and 200, and may be horizontal alignment layers.

Next, the first display panel 100 will be described. Herein, the first display panel 100 will be described together with reference to FIGS. 6 and 7.

In an exemplary embodiment, the first display panel 100 includes an insulation substrate 110, and further includes a plurality of gate conductors including a plurality of gate lines 121 and a plurality of common voltage lines 125 disposed on the insulation substrate 110.

The gate lines 121 may transmit gate signals and extend substantially in a horizontal direction. Each of the gate lines 121 may include a plurality of gate electrodes 124 protruding therefrom.

The common voltage lines 125 may transmit common voltages, and extend substantially in a horizontal direction and substantially parallel to the gate lines 121. Each of the common voltage lines 125 may include a plurality of extensions 126. Herein, the common voltages means common voltages transmitted in the display area DA shown in FIGS. 1 to 3, and may be substantially the same as or similar to the first common voltage or the second common voltage described above.

According to an exemplary embodiment, as shown in FIGS. 1 and 6, the gate conductors may include the first common voltage transmitting lines 70a and 70b, the second common voltage transmitting lines 90a and 90b, and the common voltage feedback lines 80a and 80b. The common voltage line 125 may be directly connected with the first common voltage transmitting lines 70a and 70b at the input points Pa_1, . . . , Pa_n, Pb_1, . . . , Pb_n, as described above.

The first display panel 100 further includes a gate insulating layer 140 disposed on the gate conductors 121 and 125. The gate insulating layer 140 may include an inorganic insulator, e.g., silicon nitride (SiNx) or silicon oxide (SiOx).

The first display panel 100 further includes a plurality of semiconductor stripes (not shown) disposed on the gate insulating layer 140. The semiconductor stripes may extend substantially in a vertical direction, and a plurality of semiconductor protrusions 154 extend toward the gate electrode 124 therefrom.

Referring back to FIG. 5, the first display panel 100 includes a plurality of ohmic contact stripes (not shown) and a plurality of ohmic contact islands 165 disposed on the semiconductor stripes. The ohmic contact stripe extends toward the gate electrode 124 and may have a plurality of protrusions 163 which has a substantially reversed C-like shape. The protrusion 163 and the ohmic contact island 165 may be disposed on the semiconductor protrusion 154 facing each other with respect to the gate electrode 124 to form a pair. The ohmic contacts 163 and 165 may include a material such as n+ hydrogenated amorphous silicon, in which an n-type impurity such as phosphorous is doped in high concentration, or may include silicide, for example. In an alternative exemplary embodiment, the ohmic contacts 163 and 165 may be omitted based on the characteristics of semiconductor.

The first display panel 100 includes a data conductor including a plurality of data lines 171 and a plurality of drain electrodes 175 disposed on the ohmic contacts 163 and 165.

The data lines 171 transmit data signals and mainly extend in a vertical direction to cross the gate lines 121 and the common voltage lines 125. Each of the data lines 171 may include a plurality of source electrodes 173 extending toward the gate electrode 124. In an exemplary embodiment, a second light blocking unit 222 of the light blocking member 220 may extends along the data lines 171 and may substantially cover an entire of the data lines 171.

The drain electrode 175 may include a first end facing the source electrode 173 with respect to the gate electrode 124 and a second end having a relatively wide area.

The gate electrode 124, the source electrode 173 and the drain electrode 175 collectively defines a thin film transistor ("TFT"), which is a switching element, together with the semiconductor protrusion 154. The semiconductor stripe may have substantially the same planar form as the data line 171, the drain electrode 175 and the ohmic contacts 163 and 165 therebelow, except for the semiconductor protrusion 154 where the thin film transistor is positioned.

According to an alternative exemplary embodiment, as shown in FIGS. 1 and 7, the data conductor may include the first common voltage transmitting lines 70a and 70b, the second common voltage transmitting lines 90a and 90b, and the common voltage feedback lines 80a and 80b. In such an embodiment, the common voltage line 125 may be connected with the first common voltage transmitting lines 70a and 70b at the input points Pa_1, . . . , Pa_n, Pb_1, . . . , Pb_n.

In an exemplary embodiment, the first display panel 100 includes a first passivation layer 180a disposed on the data conductors 171 and 175 and the exposed portion of the semiconductor protrusion 154. The first passivation layer 180a may include an inorganic insulator or an organic insulator. The first passivation layer 180a may include a fourth contact hole 185 exposing the drain electrode 175.

The first display panel 100 may include a pixel electrode 191 disposed on the first passivation layer 180a. The pixel electrode 191 is a surface type, which occupies substantially an entire of an area (referred to as a pixel area of the pixel PX) surrounded by the light blocking member 220. The pixel electrode 191 is electrically connected to the drain electrode 175 through the fourth contact hole 185 and may receive data voltage from the drain electrode 175. The pixel electrode 191 may be made of a transparent conductive material such as indium tin oxide ("ITO") or indium zinc oxide ("IZO").

In such an embodiment, the data conductors 171 and 175, and the exposed semiconductor protrusion 154, a second passivation layer 180b is disposed on the pixel electrode 191. The second passivation layer 180b may include an inorganic insulator or an organic insulator. A plurality of contact holes 181 exposing a part of the common voltage line 125, for example, a part of the extension 126 is disposed on the second passivation layer 180b, the first passivation layer 180a and the gate insulating layer 140. The contact hole 181 may be provided at least every two pixels PX.

Referring to the exemplary embodiment shown in FIGS. 1 and 6, the second passivation layer 180b, the first passivation layer 180a, and gate insulating layer 140 may include a first contact hole 182 exposing the end of the common voltage line 125.

Referring to the exemplary embodiment shown in FIGS. 1 and 7, the first passivation layer 180a and the second passivation layer 180b include a second contact hole 183 exposing the first common voltage transmitting lines 70a and 70b. In such an embodiment, the second passivation layer 180b, the first passivation layer 180a and the gate insulating layer 140 may include the first contact hole 182 exposing the end of the common voltage line 125.

A plurality of common electrodes 131 including a transparent conductive material such as ITO or IZO is disposed on the second passivation layer 180b. One common electrode 131 may be provided in every pixel PX, and the plurality of common electrodes 131 may be connected to each other in substantially an entire of the display area DA.

Referring back to FIGS. 4 and 5, the common electrode 131 positioned at each pixel PX may include a pair of horizontal outer stems 132 facing each other, a pair of vertical outer stems 134 connected to the horizontal outer stems 132, and a plurality of branch electrodes 133. The plurality of branch electrodes 133 is positioned between two adjacent vertical outer stems 134, and spaces between the branch electrodes 133 define slits. The common electrodes 131 adjacent to each other in a vertical direction share the horizontal outer stem 132 positioned therebetween and connected to each other and are adjacent to each other with the horizontal outer stem 132. The common electrodes 131 adjacent to each other in a horizontal direction share the vertical outer stem 134 positioned therebetween and connected thereto.

The horizontal outer stems 132 may extend substantially in a horizontal direction. The horizontal outer stems 132 include a plurality of extensions 137. In such an embodiment, one extension 137 may be provided at least in every two pixels PX and may receive the common voltage from the common voltage line 125 through the contact hole 181.

The vertical outer stems 134 and the plurality of branch electrodes 133 therebetween are connected to the two adjacent horizontal outer stems 132 and may extend substantially parallel to each other.

Referring to the exemplary embodiment shown in FIGS. 1 and 6, the common electrode 31 may receive the common voltage from the end of the common voltage line 125 through the first contact hole 182.

Referring to the exemplary embodiment shown in FIGS. 1 and 7, the end of the common voltage line 125 may be electrically connected to the first common voltage transmitting lines 70a and 70b through the common electrode 131 at the first and second contact holes 182 and 183 and the connection portion corresponds to the input points Pa_1, . . . , Pa_n, Pb_1, . . . , Pb_n shown in FIG. 1.

The pixel electrode 191 that receives the data voltage through the thin film transistor and the common electrode 131 that receives the common voltage generate an electric field in the liquid crystal layer 3 as two field generating electrodes to determine a direction of the liquid crystal molecules 31 of the liquid crystal layer 3 and display an image.

Hereinafter, an alternative exemplary embodiment of a display device according to the invention will be described with reference to FIGS. 8, 9 and 10. The same or like elements shown in FIGS. 8, 9 and 10 have been labeled with the same reference characters as used above to describe the exemplary embodiments of the display device shown in FIGS. 1, 6 and 7, and any repetitive detailed description thereof will hereinafter be omitted or simplified.

Figure 8:
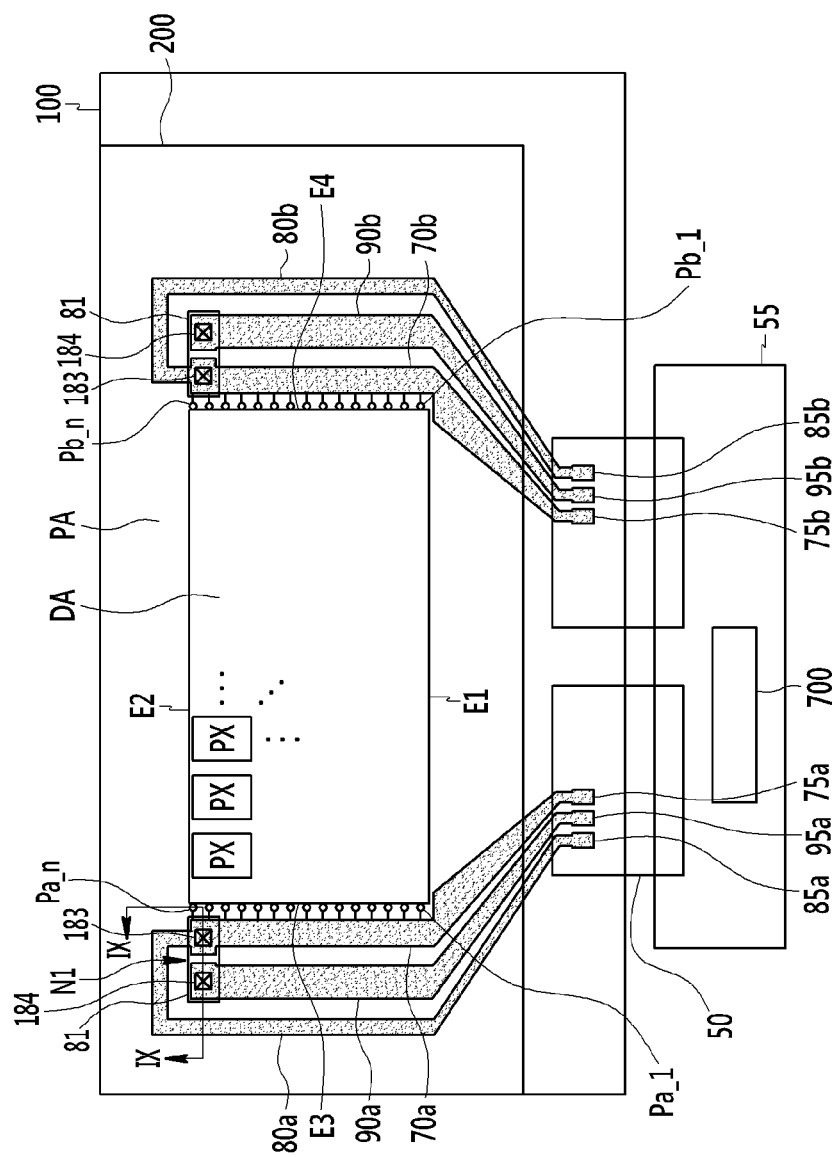
FIG. 8 is a block diagram showing an alternative exemplary embodiment of a display device according to the invention.
Figure 9:
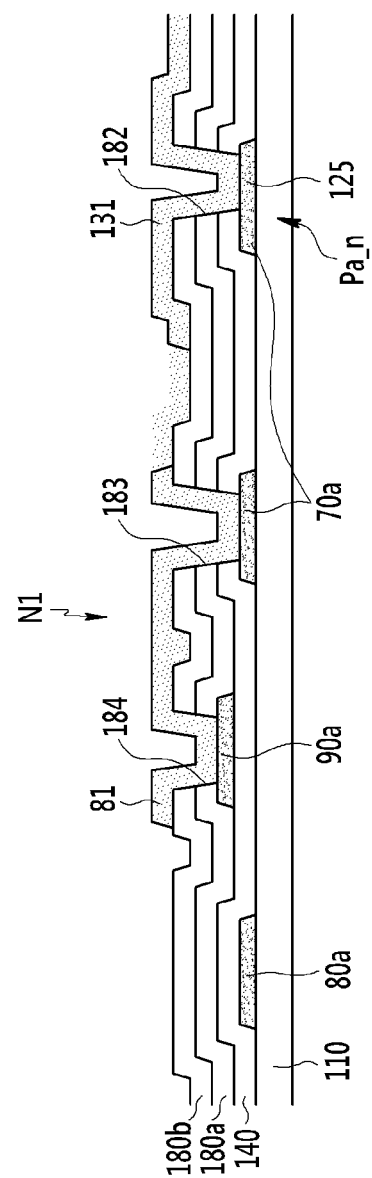
FIG. 9 is a cross-sectional view taken along line IX-IX of the display device of FIG. 8.
Figure 10:
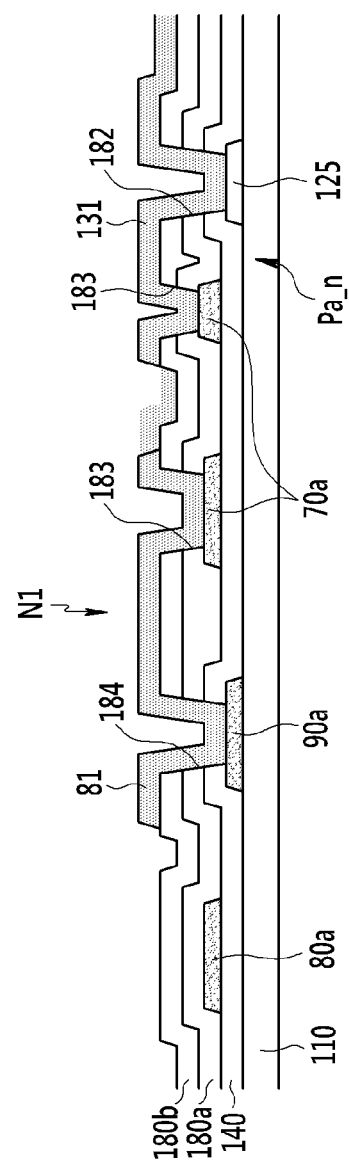
FIG. 10 is another cross-sectional view taken along line IX-IX of the display device of FIG. 8.

FIG. 8 is a block diagram showing an alternative exemplary embodiment of a display device according to the invention, FIG. 9 is a cross-sectional view taken along line IX-IX of the display device of FIG. 8, and FIG. 10 is another cross-sectional view taken along line IX-IX of the display device of FIG. 8.

Referring to FIGS. 8 to 10, an exemplary embodiment of the display device according to the invention is substantially the same as the display devices shown in FIGS. 1 to 3 described above, and a structure of the display area DA or the pixel PX may be substantially the same as the exemplary embodiment shown in FIGS. 4 and 5 described above except for the position of the first common voltage transmitting lines 70a and 70b and the second common voltage transmitting lines 90a and 90b.

First, referring to the exemplary embodiment shown in FIGS. 8 and 9, the first common voltage transmitting lines 70a and 70b, the common voltage feedback lines 80a and 80b and the common voltage line 125 may be positioned on the insulation substrate 110, and the gate insulating layer 140 may be positioned on the first common voltage transmitting lines 70a and 70b, the common voltage feedback lines 80a and 80b and the common voltage line 125. In such an embodiment, the common voltage line 125 may be directly connected to the first common voltage transmitting lines 70a and 70b at the input points Pa_1, . . . , Pa_n, Pb_1, . . . , Pb_n.

The second common voltage transmitting lines 90a and 90b, the data line 171 and the drain electrode 175 are positioned on the gate insulating layer 140, and the first passivation layer 180a may be positioned on the second common voltage transmitting lines 90a and 90b, the data line 171 and the drain electrode 175. The pixel electrode 191 is positioned on the first passivation layer 180a as shown in FIGS. 4 and 5 described above, and the second passivation layer 180b may be disposed on the pixel electrode 191.

The second passivation layer 180b, the first passivation layer 180a and the gate insulating layer 140 may include the first contact hole 182 exposing the end of the common voltage line 125 and the second contact hole 183 exposing the first common voltage transmitting lines 70a and 70b. In such an embodiment, the second passivation layer 180b and the first passivation layer 180a may include a third contact hole 184 exposing the second common voltage transmitting lines 90a and 90b.

A common electrode 131 and a contact assistant 81 may be positioned on the second passivation layer 180b. The common electrode 131 may receive common voltage from the end of the common voltage line 125 through the first contact hole 182. In such an embodiment, the first common voltage transmitting lines 70a and 70b and the second common voltage transmitting lines 90a and 90b, which are positioned in different layers, may be electrically connected to each other through the contact assistant 81 at the second and third contact holes 183 and 184, and the connection portion may correspond to the contact point N1 described above.

The common electrode 131 and the contact assistant 81 may be connected to each other. The connection portion is shown by hatching without an outer line between the common electrode 131 and the contact assistant 81 in FIG. 9.

Referring to the exemplary embodiment shown in FIGS. 8 and 10, the second common voltage transmitting lines 90a and 90b and the common voltage line 125 are positioned on the insulation substrate 110, and the gate insulating layer 140 may be positioned on the second common voltage transmitting lines 90a and 90b and the common voltage line 125. In such an embodiment, the common voltage line 125 may be connected to the first common voltage transmitting lines 70a and 70b at the input points Pa_1, . . . , Pa_n, Pb_1, . . . , Pb_n.

The first common voltage transmitting lines 70a and 70b, the common voltage feedback lines 80a and 80b, the data line 171 and the drain electrode 175 may be positioned on the gate insulating layer 140, and the first passivation layer 180a may be positioned on the first common voltage transmitting lines 70a and 70b, the common voltage feedback lines 80a and 80b, the data line 171 and the drain electrode 175. As shown in FIGS. 4 and 5, the pixel electrode 191 is positioned on the first passivation layer 180a, and the second passivation layer 180b may be positioned on the pixel electrode 191.

The second passivation layer 180b, the first passivation layer 180a and the gate insulating layer 140 may include the first contact hole 182 exposing the end of the common voltage line 125 and the third contact hole 184 exposing the second common voltage transmitting lines 90a and 90b. In such an embodiment, the second passivation layer 180b and the first passivation layer 180a may include the second contact hole 183 exposing the first common voltage transmitting lines 70a and 70b.

The common electrode 131 and the contact assistant 81 may be positioned on the second passivation layer 180b. The end of the common voltage line 125 may be electrically connected to the first common voltage transmitting lines 70a and 70b through the common electrode 131 at the first and second contact holes 182 and 183, and the connection portion may correspond to the input points Pa_1, . . . , Pa_n, Pb_1, . . . , Pb_n. In such an embodiment, the common electrode 131 may receive the common voltage from the end of the common voltage line 125 through the first contact hole 182. In such an embodiment, the first common voltage transmitting lines 70a and 70b and the second common voltage transmitting lines 90a and 90b, which are positioned in different layers, may be electrically connected to each other through the contact assistant 81 at the second and thirds contact holes 183 and 184, and the connection portion may correspond to the contact point N1 described above.

The common electrode 131 and the contact assistant 81 may be connected to each other.

In an alternative exemplary embodiment, the common voltage feedback lines 80a and 80b may also be positioned in the same layer as the second common voltage transmitting lines 90a and 90b.

Next, an exemplary embodiment of a display device according to the invention will be described in detail with reference to FIGS. 11, 12, 13, 14 and 15 together with FIGS. 1 to 3. The same or like elements shown in FIGS. 11 to 15 have been labeled with the same reference characters as used above to describe the exemplary embodiments of the display device shown in FIGS. 4 to 7, and any repetitive detailed description thereof will hereinafter be omitted or simplified.

Figure 11:
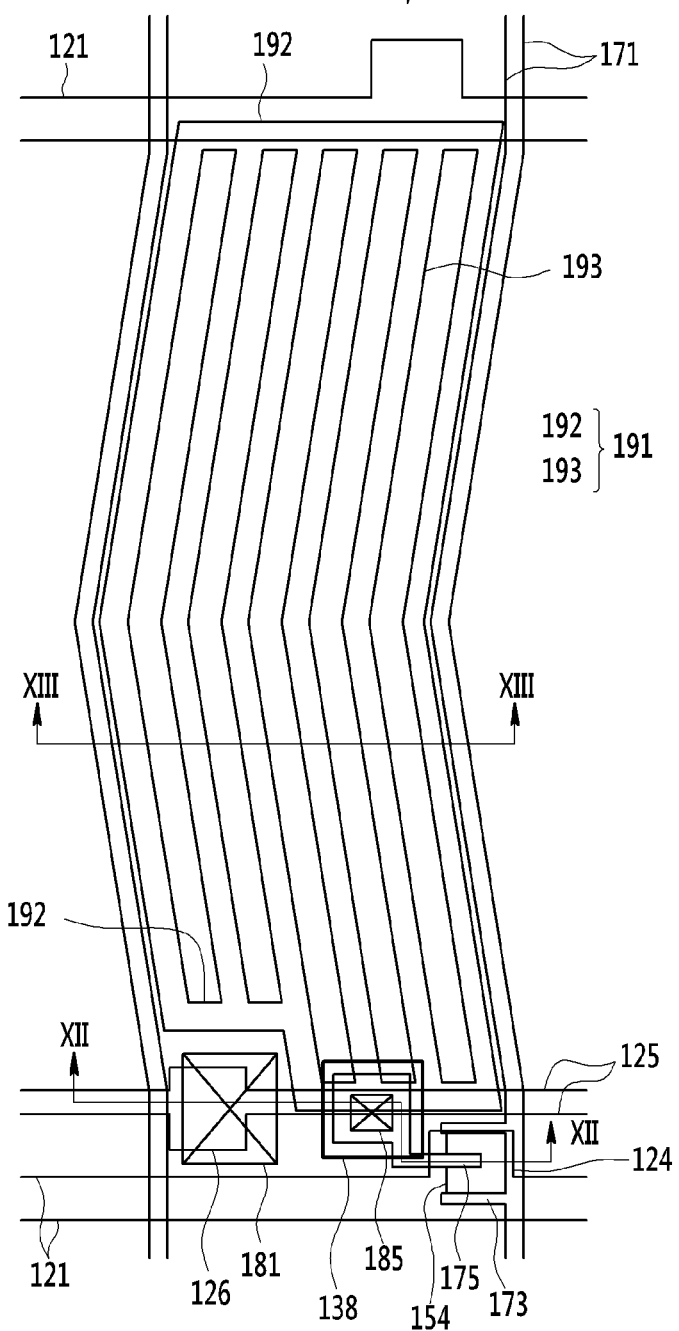
FIG. 11 is a top plan view of one pixel of another alternative exemplary embodiment of a display device according to an exemplary embodiment of the invention.
Figure 12:
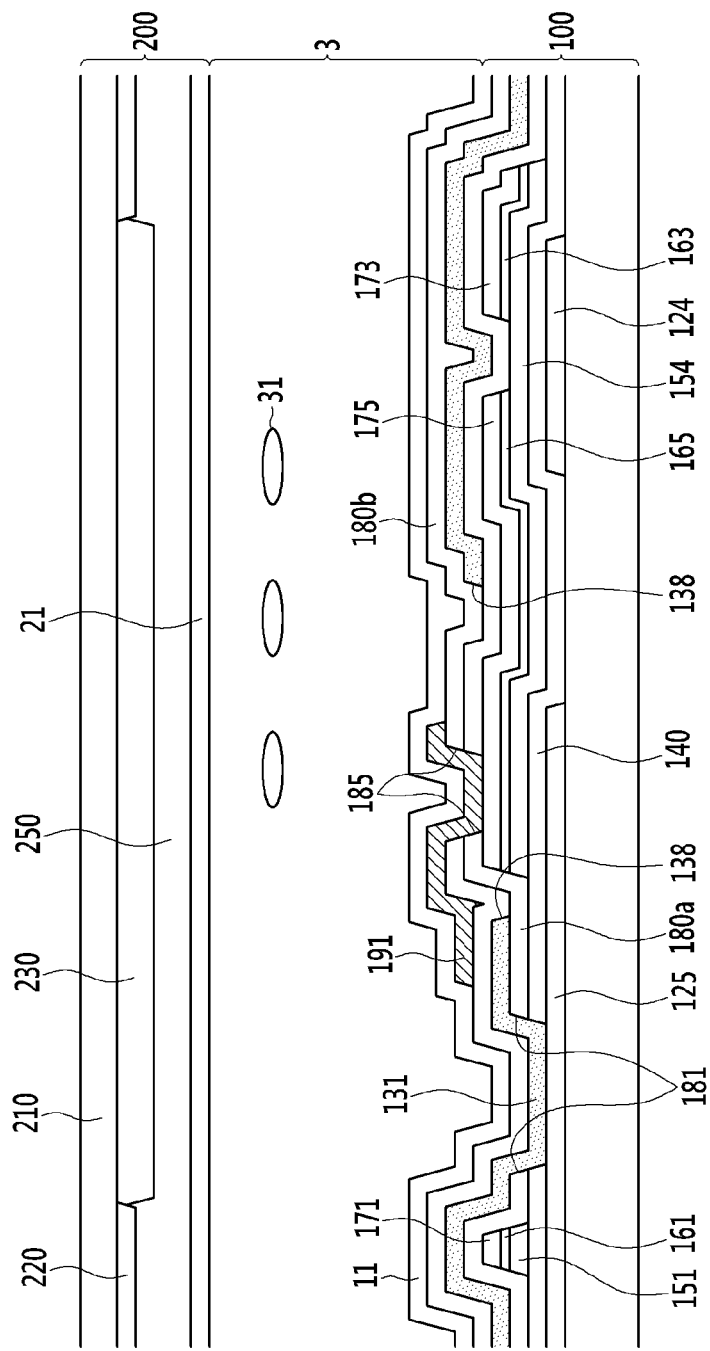
FIG. 12 is a cross-sectional view taken along line XII-XII of the display device of FIG. 11.
Figure 13:
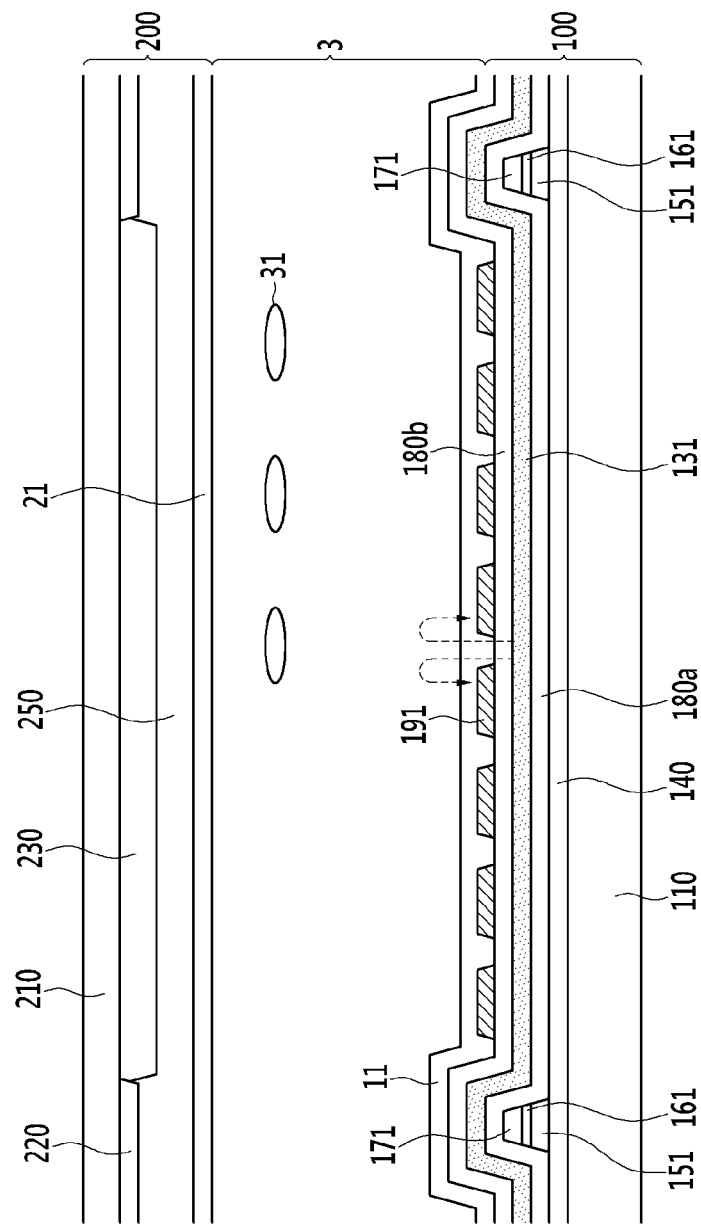
FIG. 13 is a cross-sectional view taken along line XIII-XIII of the display device of FIG. 11.
Figure 14:
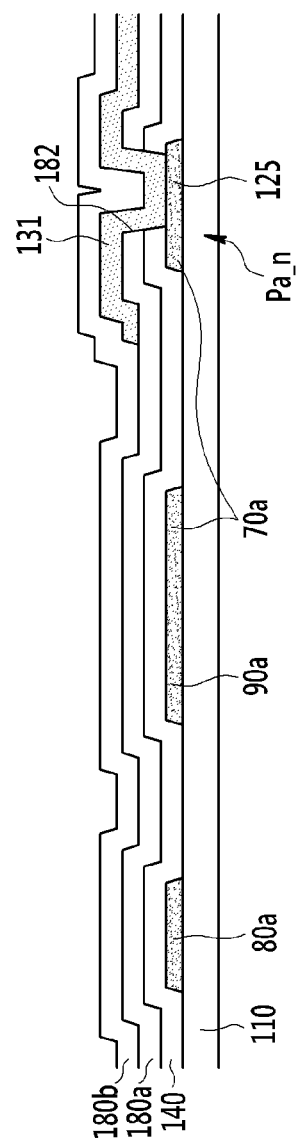
FIG. 14 is a cross-sectional view taken along line IX-IX of the display device of FIG. 8.
Figure 15:
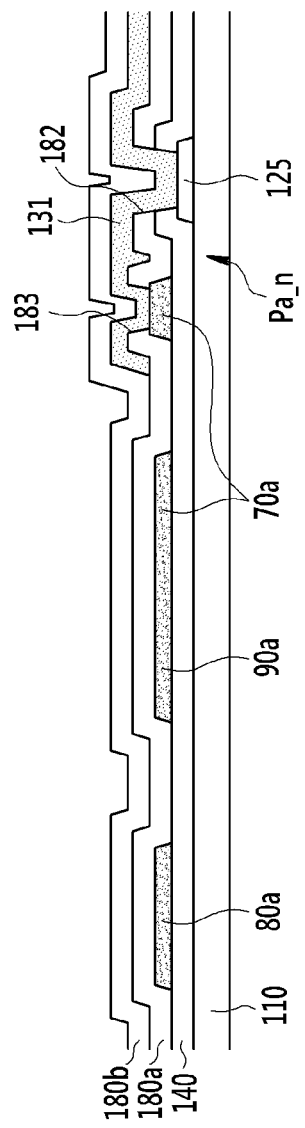
FIG. 15 is another cross-sectional view taken along line IX-IX of the display device of FIG. 8.

FIG. 11 is a top plan view for one pixel of an exemplary embodiment of the display device according to the invention, FIG. 12 is a cross-sectional view taken along line XII-XII of the display device of FIG. 11, FIG. 13 is a cross-sectional view taken along line XIII-XIII of the display device of FIG. 11, FIG. 14 is a cross-sectional view taken along line IX-IX of the display device of FIG. 8, and FIG. 15 is another cross-sectional view taken along line IX-IX of the display device of FIG. 8.

The exemplary embodiment of the display device according to the invention shown in FIGS. 11 to 13 is substantially the same as the exemplary embodiment shown in FIGS. 4 and 5, except for a laminated structure of the first display panel 100.

In such an embodiment, a plurality of gate conductors including a plurality of gate lines 121 including gate electrodes 124 and a plurality of common voltage lines 125 including extensions 126 are positioned on the insulation substrate 110, and the gate insulating layer 140 may be positioned on the gate conductors.

According to the exemplary embodiment shown in FIGS. 8 and 14, the gate conductor may include the first common voltage transmitting lines 70a and 70b, the second common voltage transmitting lines 90a and 90b, and the common voltage feedback lines 80a and 80b. The common voltage line 125 may be directly connected to the first common voltage transmitting lines 70a and 70b at the input points Pa_1, . . . , Pa_n, Pb_1, . . . , Pb_n.

In an exemplary embodiment, a plurality of semiconductor stripes 151 including protrusions 154 are disposed on the gate insulating layer 140, and an ohmic contact stripe 161 and an ohmic contact island 165 having protrusions 163 may be positioned on the semiconductor stripes 151. A data conductor including a plurality of data lines 171 including source electrodes 173 and a plurality of drain electrodes 175 may be disposed on the ohmic contacts 161 and 165.

According to the exemplary embodiment shown in FIGS. 8 and 15, the data conductor may include the first common voltage transmitting lines 70a and 70b, the second common voltage transmitting lines 90a and 90b, and the common voltage feedback lines 80a and 80b. In such an embodiment, the common voltage line 125 may be connected to the first common voltage transmitting lines 70a and 70b at the input points Pa_1, . . . , Pa_n, Pb_1, . . . , Pb_n.

In an exemplary embodiment, the first passivation layer 180a may be positioned on the data conductor. The first passivation layer 180a and the gate insulating layer 140 may include the contact hole 181 exposing the common voltage line 125.

Referring to the exemplary embodiment shown in FIGS. 8 and 14, the first passivation layer 180a and the gate insulating layer 140 may further include the first contact hole 182 exposing the end of the common voltage line 125.

Referring to the exemplary embodiment shown in FIGS. 8 and 15, the second passivation layer 180b includes the second contact hole 183 exposing the first common voltage transmitting lines 70a and 70b, and the first passivation layer 180a and the gate insulating layer 140 may include the first contact hole 182 exposing the end of the common voltage line 125.

In an exemplary embodiment, the common electrode 131 may be positioned on the first passivation layer 180a. The common electrodes 131 positioned at the plurality of pixels PX may be connected to each other in substantially an entire of the display area DA. The common electrode 131 is electrically connected to the common voltage line 125 through the contact hole 181 and receives the common voltage from the common voltage line 125.

Referring to the exemplary embodiment shown in FIGS. 8 and 14, the common electrode 131 may receive the common voltage from the end of the common voltage line 125 through the first contact hole 182.

Referring to the exemplary embodiment shown in FIGS. 8 and 15, the end of the common voltage line 125 may be electrically connected to the first common voltage transmitting lines 70a and 70b through the common electrode 131 at the first and second contact holes 182 and 183, and the connection portion may correspond to the input points Pa_1, . . . , Pa_n, Pb_1, . . . , Pb_n.

In an exemplary embodiment, the second passivation layer 180b may be positioned on the common electrode 131. In such an embodiment, the second passivation layer 180b and the first passivation layer 180a may include a fourth contact hole 185 exposing the drain electrode 175.

The pixel electrode 191 may be positioned on the second passivation layer 180b. The pixel electrode 191 is electrically connected to the drain electrode 175 through the fourth contact hole 185 to receive data voltage. The pixel electrode 191 may include a plurality of branch electrodes 193 which extend substantially parallel to and spaced apart from each other, and lower and upper horizontal parts 192 which connect upper or lower ends of the branch electrodes 193. The branch electrodes 193 of the pixel electrode 191 may be curved along the data line 171.

The pixel electrode 191 that receives the data voltage may generate an electric field in the liquid crystal layer 3 together with the common electrode 131 that receives the common voltage.

Next, an alternative exemplary embodiment of a display device according to the invention will be described with reference to FIGS. 16 and 17 together with FIGS. 8, 11, 12 and 13. The same or like elements shown in FIGS. 16 and 17 have been labeled with the same reference characters as used above to describe the exemplary embodiments of the display device shown in FIGS. 14 and 15, and any repetitive detailed description thereof will hereinafter be omitted or simplified.

Figure 16:
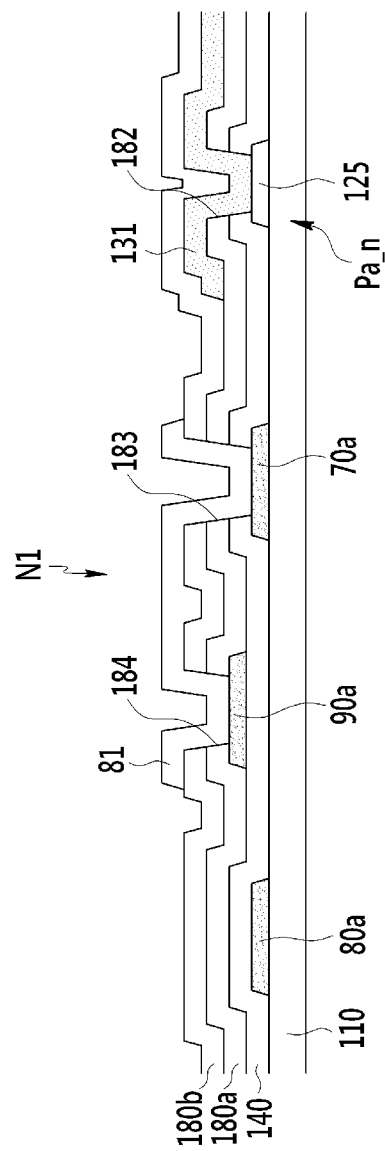
FIG. 16 is a cross-sectional view taken along line IX-IX of the display device of FIG. 8.
Figure 17:
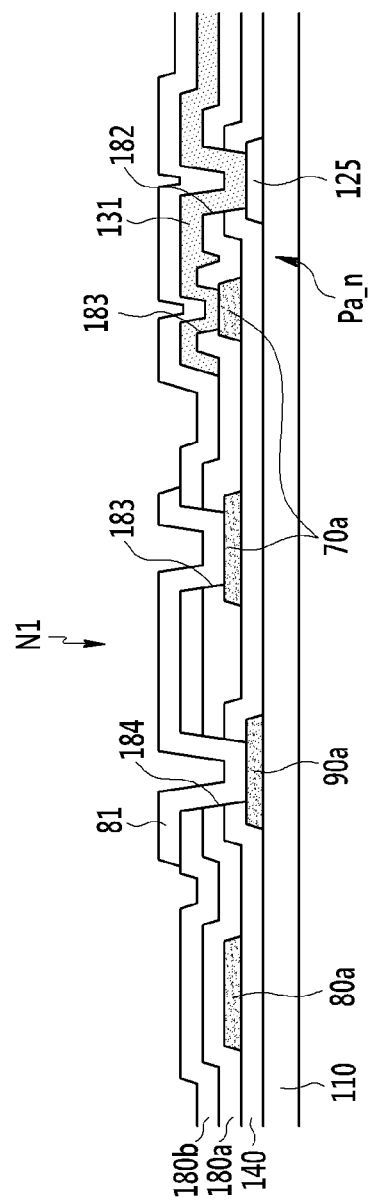
FIG. 17 is another cross-sectional view taken along line IX-IX of the display device of FIG. 8.

FIG. 16 is a cross-sectional view taken along line IX-IX of the display device of FIG. 8, and FIG. 17 is another cross-sectional view taken along line IX-IX of the display device of FIG. 8.

In such an embodiment, the first common voltage transmitting lines 70a and 70b and the second common voltage transmitting lines 90a and 90b may be positioned in different layers.

First, referring to the exemplary embodiment shown in FIGS. 8 and 16, the first common voltage transmitting lines 70a and 70b, the common voltage feedback lines 80a and 80b and the common voltage line 125 may be positioned on the insulation substrate 110, and the gate insulating layer 140 may be positioned on the first common voltage transmitting lines 70a and 70b, the common voltage feedback lines 80a and 80b and the common voltage line 125. In such an embodiment, the common voltage line 125 may be directly connected to the first common voltage transmitting lines 70a and 70b at the input points Pa_1, . . . , Pa_n, Pb_1, . . . , Pb_n.

The second common voltage transmitting lines 90a and 90b, the data line 171 and the drain electrode 175 are positioned on the gate insulating layer 140, and the first passivation layer 180a may be positioned on the second common voltage transmitting lines 90a and 90b, the data line 171 and the drain electrode 175. The common electrode 131 is positioned on the first passivation layer 180a as the exemplary embodiment shown in FIGS. 11 to 13, and the second passivation layer 180b may be disposed on the common electrode 131.

The first passivation layer 180a and the gate insulating layer 140 may include the first contact hole 182 exposing the end of the common voltage line 125, and the second passivation layer 180b, the first passivation layer 180a and the gate insulating layer 140 may include the second contact hole 183 exposing the first common voltage transmitting lines 70a and 70b. In such an embodiment, the second passivation layer 180b and the first passivation layer 180a may include the contact hole 184 exposing the second common voltage transmitting lines 90a and 90b. The common electrode 131 may receive common voltage from the end of the common voltage line 125 through the first contact hole 182.

The contact assistant 81 may be positioned on the second passivation layer 180b together with the pixel electrode 191. The first common voltage transmitting lines 70a and 70b and the second common voltage transmitting lines 90a and 90b, which are positioned in different layers, may be electrically connected to each other through the contact assistant 81 at the third contact hole 184, and the connection portion may correspond to the contact point N1.

Referring to the exemplary embodiment shown in FIGS. 8 and 17, the second common voltage transmitting lines 90a and 90b and the common voltage line 125 are positioned on the insulation substrate 110, and the gate insulating layer 140 may be positioned on the second common voltage transmitting lines 90a and 90b and the common voltage line 125. In such an embodiment, the common voltage line 125 may be connected to the first common voltage transmitting lines 70a and 70b at the input points Pa_1, . . . , Pa_n, Pb_1, . . . , Pb_n.

The first common voltage transmitting lines 70a and 70b, the common voltage feedback lines 80a and 80b, the data line 171 and the drain electrode 175 may be positioned on the gate insulating layer 140, and the first passivation layer 180a may be positioned on the first common voltage transmitting lines 70a and 70b, the common voltage feedback lines 80a and 80b, the data line 171 and the drain electrode 175. As shown in FIGS. 11 to 13, the common electrode 131 may be positioned on the first passivation layer 180a, and the second passivation layer 180b may be positioned on the common electrode 131.

The first passivation layer 180a and the gate insulating layer 140 may include the first contact hole 182 exposing the end of the common voltage line 125, and the second passivation layer 180b, the first passivation layer 180a and the gate insulating layer 140 may include the third contact hole 184 exposing the second common voltage transmitting lines 90a and 90b. In such an embodiment, the second passivation layer 180b and the first passivation layer 180a may include the second contact hole 183 exposing the first common voltage transmitting lines 70a and 70b, and the first passivation layer 180a may include the second contact hole 183 exposing the first common voltage transmitting lines 70a and 70b.

The end of the common voltage line 125 may be electrically connected to the first common voltage transmitting lines 70a and 70b through the common electrode 131 at the first and second contact holes 182 and 183, and the connection portion may correspond to the input points Pa_1, . . . , Pa_n, Pb_1, . . . , Pb_n. In such an embodiment, the common electrode 131 may receive the common voltage from the end of the common voltage line 125 through the first contact hole 182.

The pixel electrode 191 and the contact assistant 81 may be positioned on the second passivation layer 180b. The first common voltage transmitting lines 70a and 70b and the second common voltage transmitting lines 90a and 90b, which are positioned in different layers, may be electrically connected to each other through the contact assistant 81 at the second and third contact holes 183 and 184, and the connection portion may correspond to the contact point N1.

In the exemplary embodiment shown in FIGS. 8 and 17, the contact assistant 81 may also be positioned in the same layer as the common electrode 131, and the two separated contact holes 183 may coincide with each other.

Next, a display device according to an exemplary embodiment of the invention will be described with reference to FIGS. 18 and 19.

Figure 18:
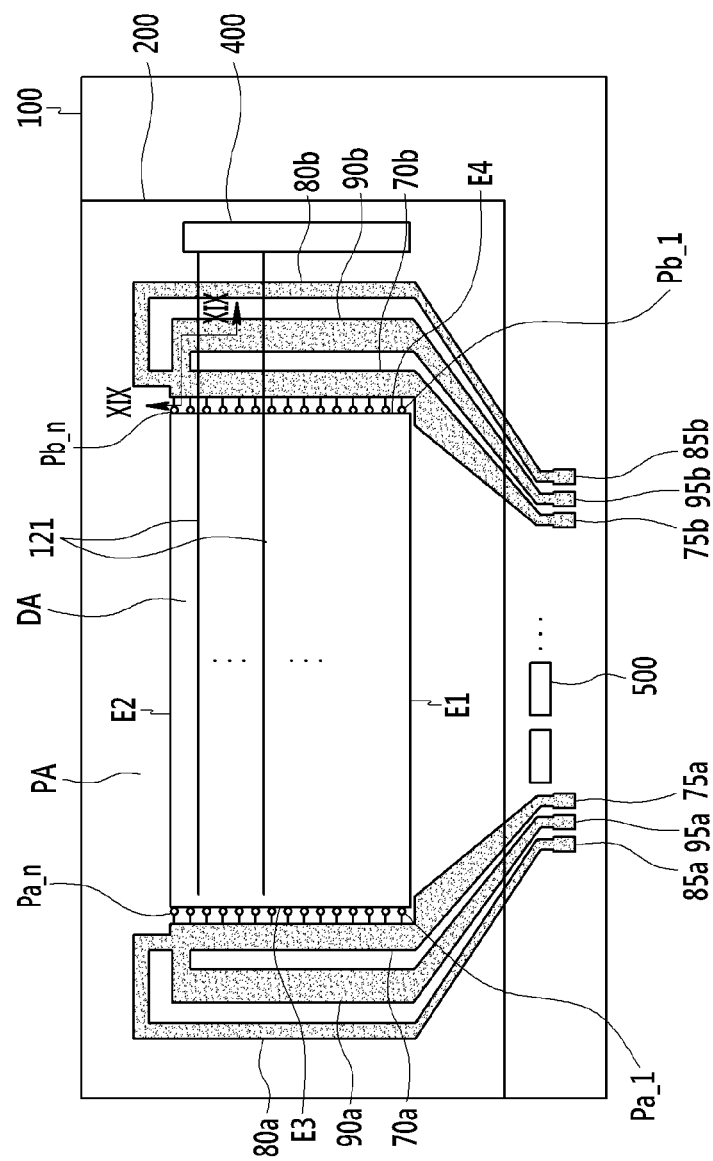
FIG. 18 is a block diagram showing another alternative exemplary embodiment of a display device according to the invention.
Figure 19:
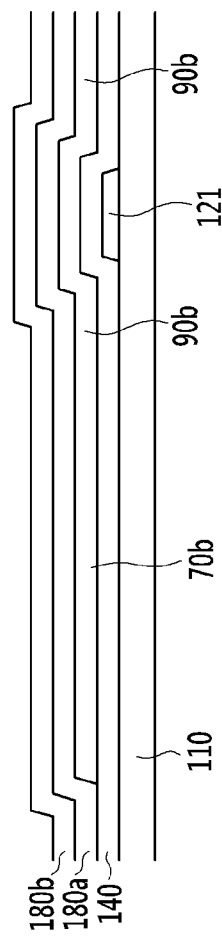
FIG. 19 is a cross-sectional view of the display device of FIG. 18 taken along line XIX-XIX.

FIG. 18 is a block diagram showing another alternative exemplary embodiment of a display device according to the invention, and FIG. 19 is a cross-sectional view taken along line XIX-XIX of the display device of FIG. 18.

Referring to FIGS. 18 and 19, the exemplary embodiment of the display device is substantially the same as the display devices shown in FIGS. 1, 8 except that the display device of FIGS. 18 and 19 includes a driver. The driver may include a gate driver 400 that transmits a gate signal and a data driver 500 that transmits a data signal.

As shown in FIG. 18, the gate line 121 connected to the gate driver 400 may extend substantially in a horizontal direction in the display area DA. In such an embodiment, the gate driver 400 may be positioned in the peripheral area PA outside a third edge E3 or a fourth edge E4 of the display area DA.

In an exemplary embodiment, the gate driver 400, the first common voltage transmitting lines 70*a* and 70*b* and the second common voltage transmitting lines 90*a* and 90*b* are positioned in the peripheral area PA, as shown in FIG. 19, a layer, on which the gate line 121 is positioned, and a layer, on which the first common voltage transmitting lines 70*a* and 70*b* and the second common voltage transmitting lines 90*a* and 90*b* are positioned, may be different from each other. In one exemplary embodiment, for example, the gate line 121 is positioned below the gate insulating layer 140, and the first common voltage transmitting lines 70*a* and 70*b* and the second common voltage transmitting lines 90*a* and 90*b* may be positioned between the gate insulating layer 140 and the first passivation layer 180*a*.

The data driver 500 may be positioned in the peripheral area PA adjacent to the first edge E1 of the display area DA.

Next, another alternative exemplary embodiment of a display device according to the invention will be described with reference to FIGS. 20 and 21.

Figure 20:
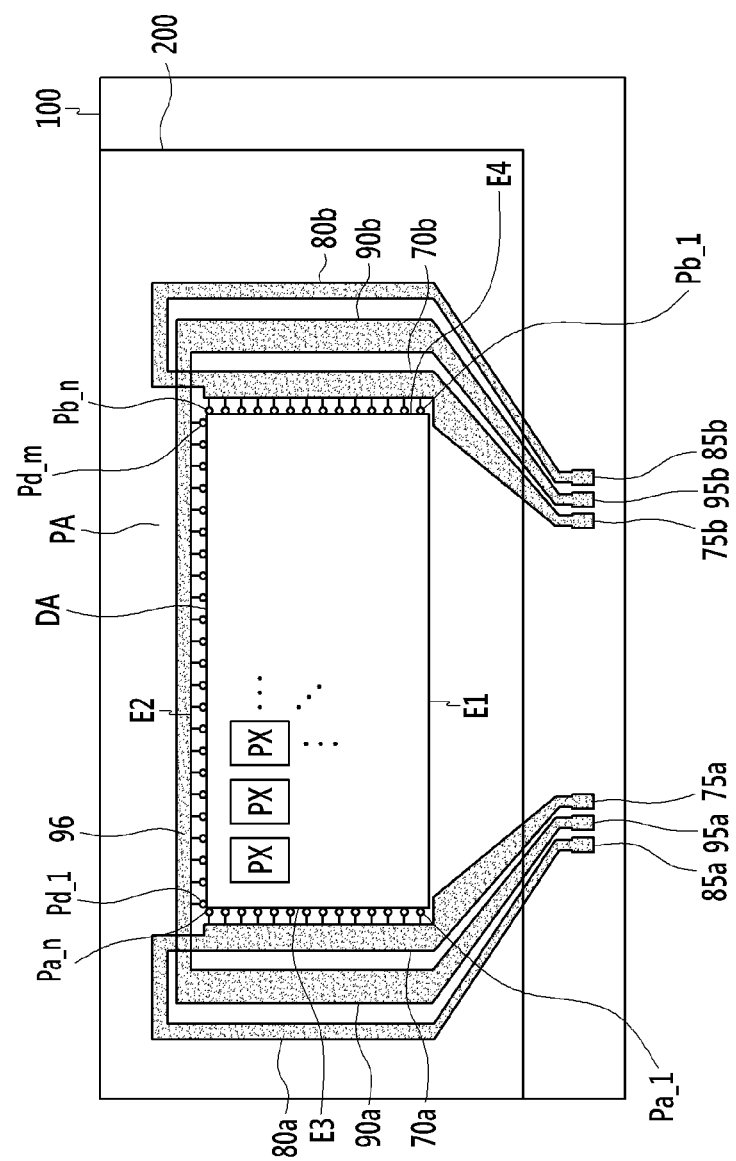
FIG. 20 is a block diagram showing another a display device according to the invention.
Figure 21:
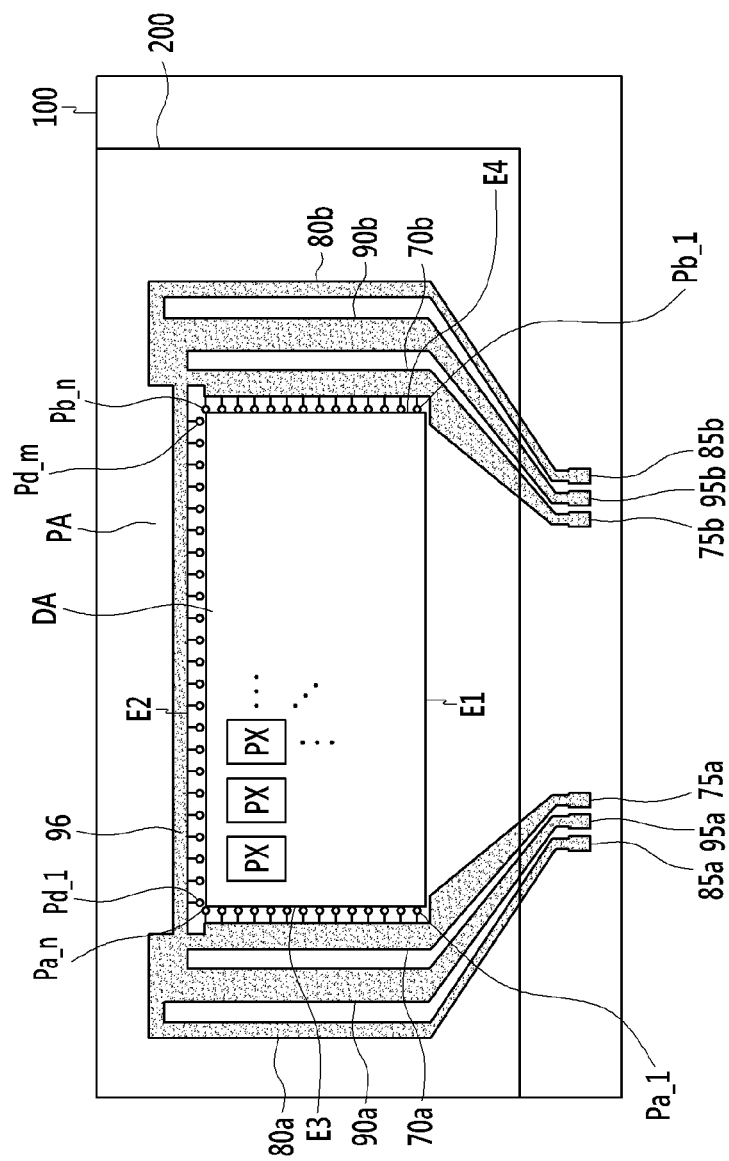
FIG. 21 is a block diagram showing another alternative exemplary embodiment of a display device according to the invention.

FIGS. 20 and 21 are block diagrams showing alternative exemplary embodiments of a display device according to the invention.

The display device shown in FIG. 20 is substantially the same as the display device shown in FIGS. 1 and 2 except for a structure of the second common voltage transmitting lines 90*a* and 90*b*.

In an exemplary embodiment, as shown in FIG. 20, the second common voltage transmitting lines 90*a* and 90*b* may not be connected to the first common voltage transmitting lines 70*a* and 70*b* in the peripheral area PA and may directly input the second common voltage to the display area DA. In such an embodiment, the first common voltage transmitting lines 70*a* and 70*b* and the second common voltage transmitting lines 90*a* and 90*b* may be positioned in different layers.

In such an embodiment, the second common voltage transmitting lines 90*a* and 90*b* may further include a connection part 96 that connects the second common voltage transmitting lines 90*a* and 90*b* and extending along the second edge E2 of the display area DA. The second common voltage transmitting lines 90*a* and 90*b* may input the second common voltage to a common voltage line or a common electrode, which is positioned at the second edge E2 of the display area DA, through a plurality of supplementary common voltage input points (hereinafter, referred to as "supplementary input points") Pd_1, . . . , Pd_m (m is a natural number equal to or greater than 2).

In an exemplary embodiment, the supplementary input points Pd_1, . . . , Pd_m may be adjacent to the second edge E2 and arranged along the second edge E2 of the display area DA in sequence at a substantially constant interval therebetween. In such an embodiment, the supplementary input points Pd_1, . . . , Pd_m may be closer to the last input points Pa_n and Pb_n than the first input points Pa_1 and Pb_1.

The display device shown in FIG. 21 is substantially the same as the exemplary embodiment shown in FIG. 20, except that the first common voltage transmitting lines 70*a* and 70*b* and the second common voltage transmitting lines 90*a* and 90*b* may be positioned in the same layer to be directly connected to each other.

In such an embodiment, other features of the display device shown in FIG. 21, e.g., a feature of the second common voltage, are substantially the same as the corresponding features of the exemplary embodiment shown in FIGS. 1 and 2 described above.

Hereinafter, another alternative exemplary embodiment of a display device according to the invention will be described with reference to FIG. 22. The same or like elements shown in FIG. 22 have been labeled with the same reference characters as used above to describe the exemplary embodiments of the display device shown in FIGS. 8, 2 and 21, and any repetitive detailed description thereof will hereinafter be omitted or simplified.

Figure 22:
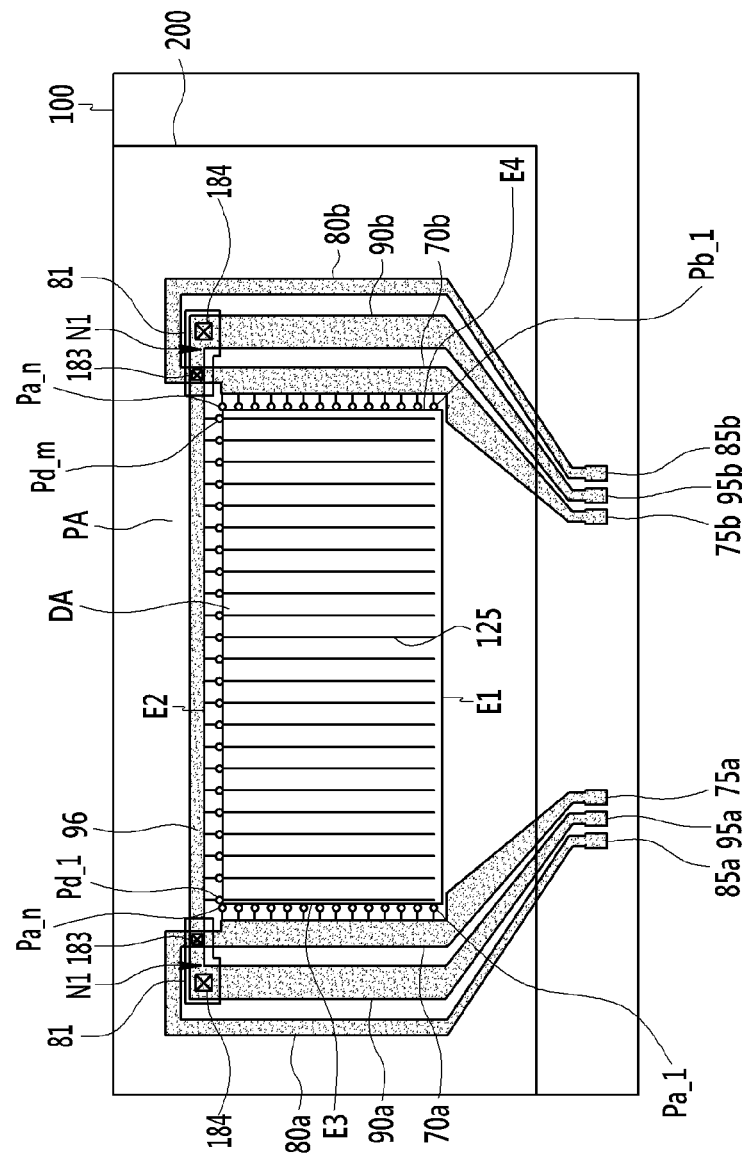
FIG. 22 is a block diagram showing another alternative exemplary embodiment of a display device according the invention.

FIG. 22 is a block diagram showing an exemplary embodiment of a display device according to the invention.

Referring to FIG. 22, the display device is substantially the same as the display device shown in FIG. 8, except that the second common voltage transmitting lines 90*a* and 90*b* may directly transmit the second common voltage to the display area DA at the second edge E2.

In an exemplary embodiment, as shown in FIG. 22, the second common voltage transmitting lines 90*a* and 90*b* may input the second common voltage to a common voltage line or a common electrode of the display area DA through the supplementary input points Pd_1, . . . , Pd_m, which are positioned along the second edge E2. In such an embodiment, a plurality of common voltage lines 125 formed in the display area DA may extend in a vertical direction as shown in FIG. 22. Each of the common voltage lines 125 may receive the second common voltage from the second common voltage transmitting lines 90*a* and 90*b* through the supplementary input points Pd_1, . . . , Pd_m. In such an embodiment, the first common voltage transmitting lines 70*a* and 70*b* may transmit the first common voltage to the common electrode 131 of the display area DA through the input points Pa_1, . . . , Pa_n, Pb_1, . . . , Pb_n.

The supplementary input points Pd_1, . . . , Pd_m may be arranged along the second edge E2 of the display area DA in sequence at a substantially constant interval therebetween.

Referring to FIG. 22, the first common voltage transmitting lines 70*a* and 70*b* and the second common voltage transmitting lines 90*a* and 90*b* may be positioned in different layers and may be connected to each other by the second and third contact holes 183 and 184 through the contact assistant 81. The connection portion may correspond to the contact point N1, as described above. In such an embodiment, however, the contact point N1 may not be arranged together with the last input point Pa_n.

In an alternative exemplary embodiment, the first common voltage transmitting lines 70*a* and 70*b* and the second common voltage transmitting lines 90*a* and 90*b* may also be positioned in the same layer. In such an embodiment, the second and third contact holes 183 and 184 and the contact assistant 81 may be omitted.

In an exemplary embodiment, other features of the display device shown in FIG. 22, e.g., the feature of the second common voltage, are substantially the same as the corresponding features of the exemplary embodiments shown in FIGS. 1, 2 and 8 described above.

Next, alternative exemplary embodiments of a display device according to the invention will be described with reference to FIGS. 23A, 23B, 23C, 24 and 25.

Figure 23A:
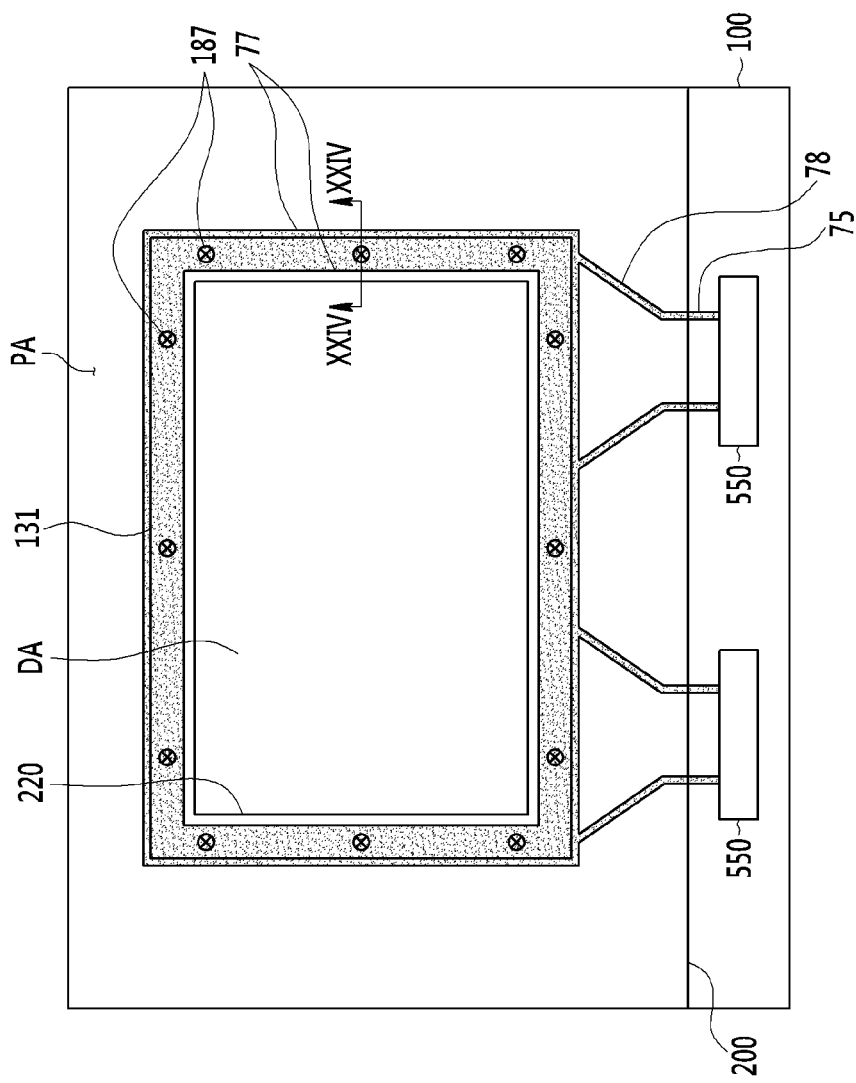
Figure 23B:
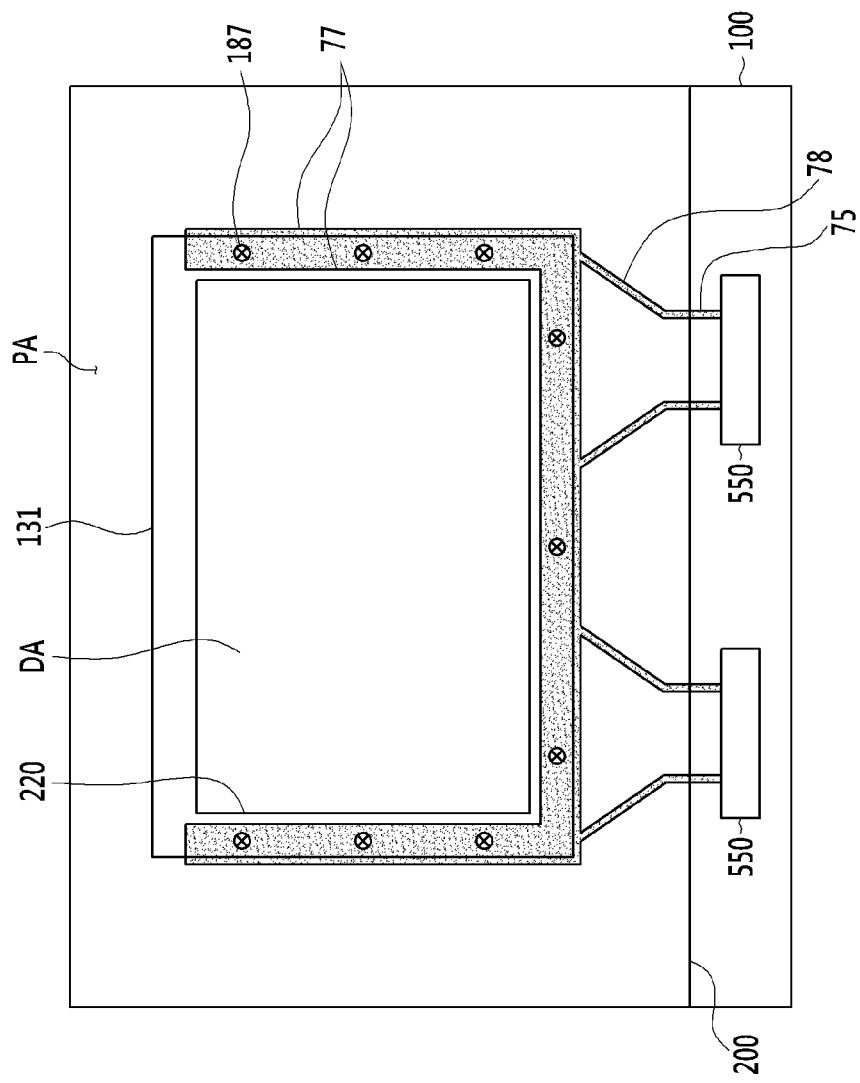
Figure 24:
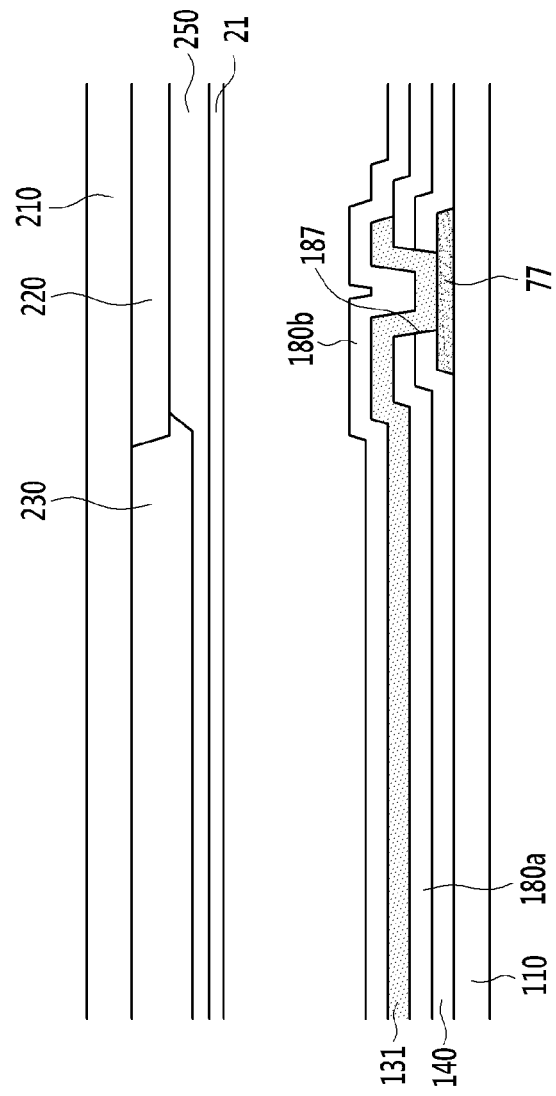
FIG. 24 is a cross-sectional view taken along line XXIV-XXIV of the display device of FIG. 23A.
Figure 25:
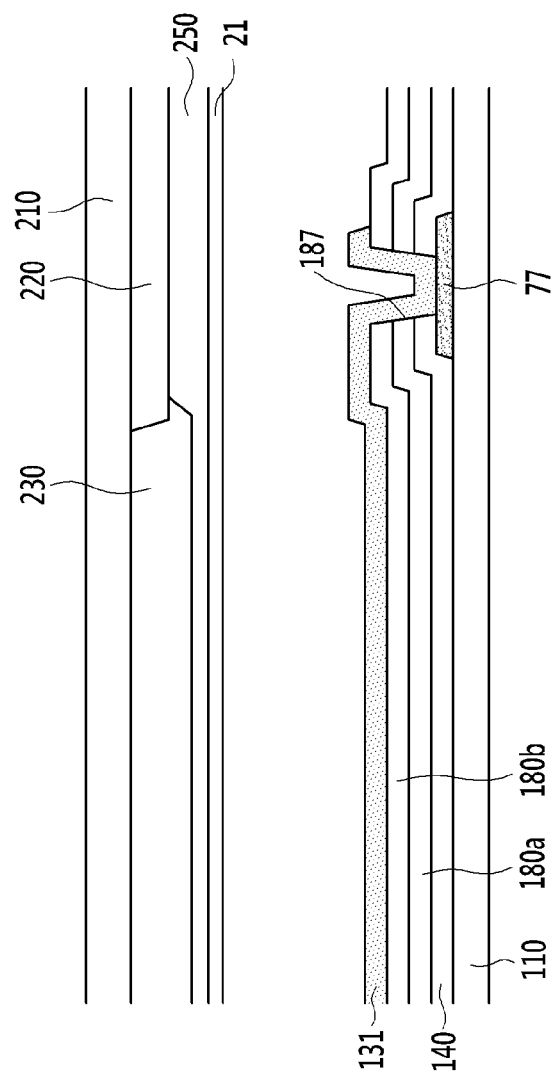
FIG. 25 is another cross-sectional view taken along line XXIV-XXIV of the display device of FIG. 23A.

FIGS. 23A, 23B and 23C are block diagrams showing exemplary embodiments of a display device according to the invention, FIG. 24 is a cross-sectional view taken along line XXIV-XXIV of the display device of FIG. 23A, and FIG. 25 is another cross-sectional view taken along line XXIV-XXIV of the display device of FIG. 23A.

Referring to FIGS. 23A, 23B and 23C, an exemplary embodiment of the display device according to the invention includes a first display panel 100 including a display area DA for displaying an image and a peripheral area PA substantially surrounding the display area DA and a second display panel 200 facing the first display panel 100. A light blocking member 220 is provided in the peripheral area PA, and the display area DA may be defined by an opening of the light blocking member 220 in the peripheral area PA.

A plurality of driving signal lines and a plurality of pixels, which are connected to the driving signal lines and arranged substantially in a matrix form, are disposed in the display area DA. A common electrode 131 that receives common voltage is disposed on a surface, e.g., a front surface, of the display area DA.

A part of the peripheral area PA of the first display panel 100 may not be covered by the second display panel 200 to be exposed. Signal input pads for inputting driving signals, such as a gate signal and a data signal, to a driving signal line of the display area DA and a driving circuit unit 550 for applying the driving signals to the driving signal line may be positioned in the exposed peripheral area PA of the first display panel 100.

First common voltage transmitting lines 77, which extend along edges of at least three sides of the display area DA and surround at least a portion of the display area DA, are positioned in the peripheral area PA of the first display panel 100. Herein, at least three sides may be at least three sides of all sides of the display area DA, e.g., upper side, lower side, left side and right side.

In an exemplary embodiment, the first common voltage transmitting lines 77 may have the form of a closed curve or a closed polygon surrounding all sides of the display area DA as shown in FIG. 23A. In an alternative exemplary embodiment, the first common voltage transmitting lines 77 may have the form of an open curve or an open polygon, and not positioned outside an upper side or a lower side of the display area DA, as shown in FIG. 23B.

The first common voltage transmitting lines 77 may be connected to a plurality of input pads 75, which is positioned in the exposed peripheral area PA of the first display panel 100, through a plurality of connection wirings 78.

The connection wirings 78 are disposed along the first common voltage transmitting lines 77 positioned below the display area DA at a substantially constant interval therebetween and connected to the first common voltage transmitting lines 77.

In an exemplary embodiment, the input pads 75 may receive the first common voltage through a flexible printed circuit film (not shown). In an alternative exemplary embodiment, the input pads 75 may receive the first common voltage from the driving circuit unit 550 as shown in FIGS. 23A, 23B and 23C.

In an exemplary embodiment, the first common voltage transmitting lines 77 extending along the edge of the display area DA may be disposed in a same layer as shown in FIGS. 23A and 23B. In an alternative exemplary embodiment, the first common voltage transmitting lines 77 may be disposed in different layers as shown in FIG. 23C.

Referring now to FIG. 23C, when a side of the display area DA, where the driving circuit unit 550 is positioned, is referred to as a lower side, the first common voltage transmitting lines 77 may include upper and lower first common voltage transmitting lines 77a and 77b, which are positioned along the upper and lower sides of the display area DA, respectively, and right and left first common voltage transmitting lines 77c and 77d, which are positioned along the right and left sides of the display area DA, respectively. At least one of the upper and lower first common voltage transmitting lines 77a and 77b and the right and left first common voltage transmitting lines 77c and 77d may be disposed in a different layer from the rest of the first common voltage transmitting lines. In one exemplary embodiment, for example, the upper and lower first common voltage transmitting lines 77a and 77b are positioned in the same layer, and the right and left first common voltage transmitting lines 77c and 77d may be positioned in a different layer from the upper and lower first common voltage transmitting lines 77a and 77b. In such an embodiment, the adjacent first common voltage transmitting lines 77a, 77b, 77c and 77d may be electrically connected to each other through a connecting member 88. The connecting member 88 may electrically connect the adjacent first common voltage transmitting lines 77a, 77b, 77c and 77d through a contact hole 188, which is disposed in an insulting layer (not shown) positioned between the first common voltage transmitting lines 77a, 77b, 77c and 77d and the connecting member 88.

The first common voltage transmitting lines 77 may include a conductive material having low resistance, e.g., a metal, such as copper.

Referring now to cross-sectional structures shown in FIGS. 24 and 25, an exemplary embodiment of the display device according to the invention may be a liquid crystal display and may include the liquid crystal layer 3 interposed between the first display panel 100 and the second display panel 200 which face each other.

In such an embodiment, the second display panel 200 and the liquid crystal layer 3 are substantially the same as the exemplary embodiments shown in FIGS. 2 and 3, and any repetitive detailed description thereof will be omitted or simplified.

In the exemplary embodiment, the first display panel 100 includes an insulation substrate 110. In such an embodiment, the first common voltage transmitting line 77 is positioned on the insulation substrate 110, and the gate insulating layer 140 and the first passivation layer 180a are positioned on the first common voltage transmitting line 77 in sequence. The gate insulating layer 140 and the first passivation layer 180a include a contact hole 187 exposing the first common voltage transmitting line 77. Referring to FIGS. 23A, 23B and 23C, a plurality of contact holes 187 may be formed along the first common voltage transmitting lines 77 and may be disposed at a substantially constant interval therebetween. In such an embodiment, the plurality of contact holes 187 may be formed along edges of at least three sides of the display area DA.

The common electrode 131 that receives common voltage may be positioned on the first passivation layer 180a.

The second passivation layer 180b may be positioned on the common electrode 131, and a pixel electrode (not shown) may be positioned on the second passivation layer 180b. In such an embodiment, the common electrode 131 and the pixel electrode are substantially the same as the exemplary embodiments shown in FIGS. 2 and 3, and any repetitive detailed description thereof will be omitted.

In the exemplary embodiment shown in FIG. 25, a pixel electrode (not shown) may be positioned between the first passivation layer 180a and the second passivation layer 180b, and the common electrode 131 may be positioned on the second passivation layer 180b.

In such an embodiment, the common electrode 131 according to the exemplary embodiment receives the first common voltage from the first common voltage transmitting line 77 through the contact hole 187 formed along edges of at least three sides of the display area DA such that a voltage level of the common voltage may be substantially uniform throughout the entire of the common electrode 131 in the display area DA. In such an embodiment, the contact hole 187 exposing the first common voltage transmitting line 77 may correspond to the common voltage input point described above.

Then, another alternative exemplary embodiment of a display device according to the invention will be described in detail with reference to FIGS. 26, 27 and 28 and referring back to the exemplary embodiment shown in FIGS. 23A to 25 described above.

Figure 26:
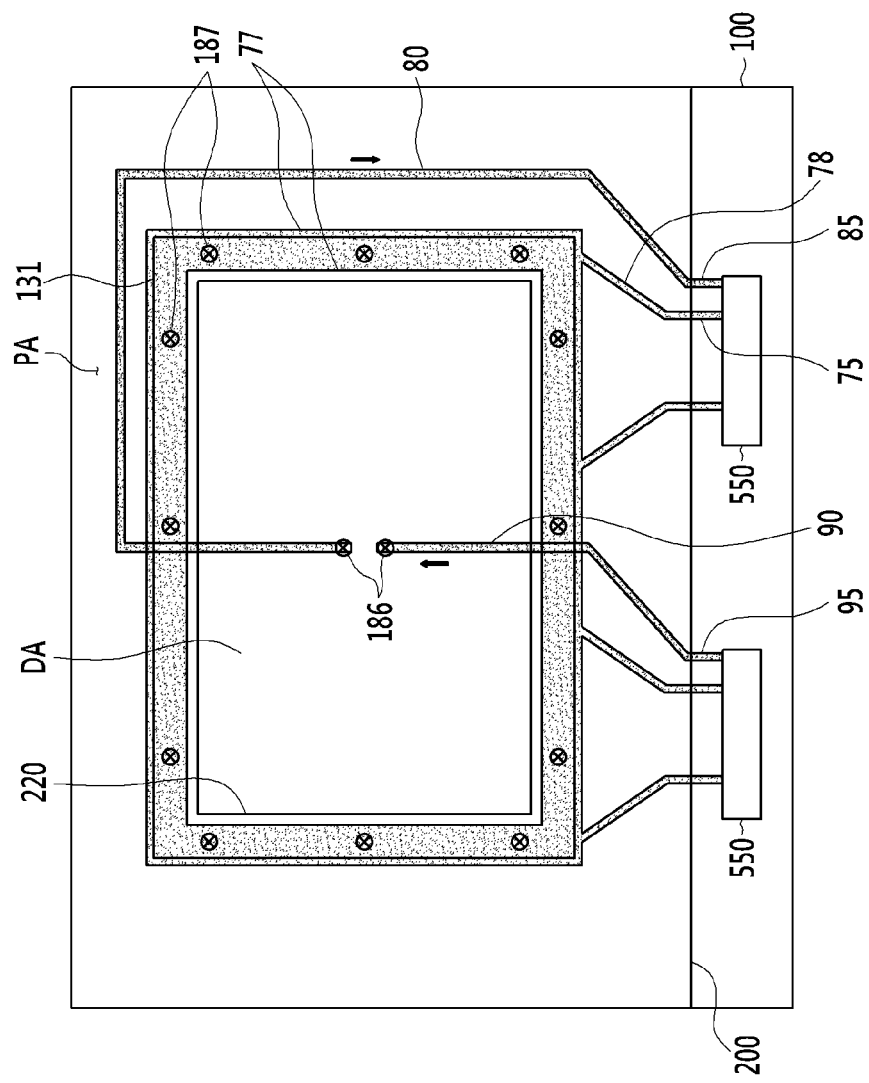
FIG. 26 is a block diagram showing another alternative exemplary embodiment of a display device according to the invention.
Figure 27:
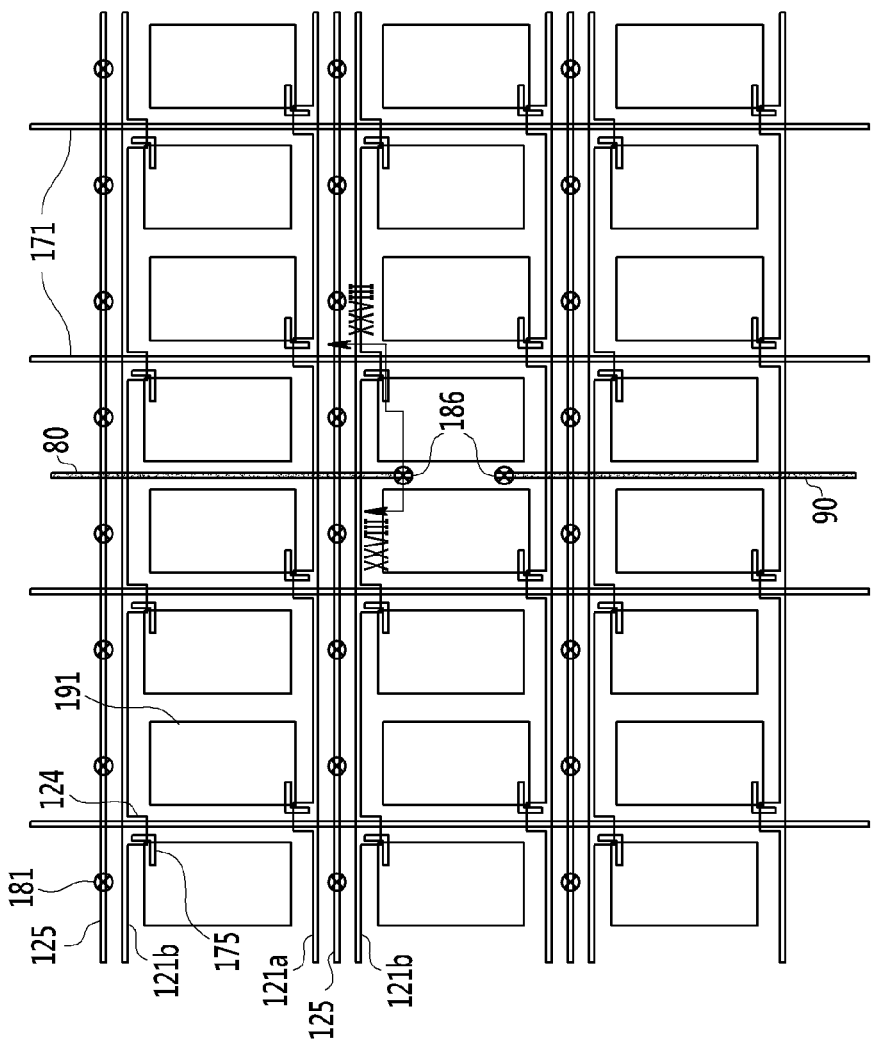
FIG. 27 is a block diagram showing another alternative exemplary embodiment of a display area of a display device according to the invention.
Figure 28:
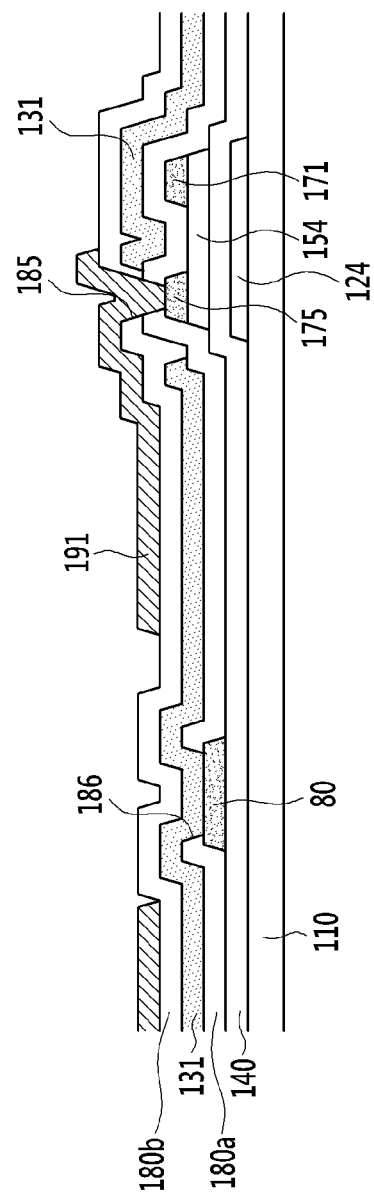
FIG. 28 is a cross-sectional view taken along line XXVIII-XXVIII of the display device of FIG. 27.

FIG. 26 is a block diagram showing an exemplary embodiment of a display device according to the invention, FIG. 27 is a block diagram showing a display area of an exemplary embodiment of a display device according to the invention, and FIG. 28 is a cross-sectional view taken along line XXVIII-XXVIII of the display device of FIG. 27.

The display device shown in FIG. 26 is substantially the same as the exemplary embodiment shown in FIG. 23 except that the display device of FIG. 26 further include a common voltage feedback line 80 and a second common voltage transmitting line 90.

In an exemplary embodiment, the common voltage feedback line 80 and the second common voltage transmitting line 90 are electrically connected to the common electrode 131 in the display area DA through a feedback output point and a supplementary common voltage input point, respectively. In such an embodiment, the feedback output point and the supplementary common voltage input point may be contact holes 186 of an insulating layer positioned on the common voltage feedback line 80 and the second common voltage transmitting line 90.

In such an embodiment, the common voltage feedback line 80 and the second common voltage transmitting line 90 may be electrically connected to the common electrode 131 at a connecting portion thereof, e.g., a portion at the center of the display area DA. In such an embodiment, the connecting portion may be positioned at a point where substantial voltage drop, noise or ripple of the common voltage occur, e.g., the center of the display area DA which is farthest away from the contact hole 187 that receives the common voltage. However, points where the common voltage feedback line 80 and the second common voltage transmitting line 90 are connected to the common electrode 131 through the contact holes 186 are not limited to those described above and may be variously defined. In such an embodiment, the contact hole 186 positioned on the second common voltage transmitting line 90 may correspond to the supplementary common voltage input point described above. The contact hole 186 positioned on the common voltage feedback line 80 is called a feedback output point, and the feedback output point may be provided on the contact hole of the insulating layer with various configurations.

The common voltage feedback line 80 receives the common voltage of the common electrode 131 from the contact hole 186 positioned in the display area DA and transmits the received common voltage to an output pad 85 as feedback voltage. The feedback voltage outputted from the output pad 85 may be inputted to a signal controller (not shown) as described above.

The second common voltage transmitting line 90 receives second common voltage generated based on the feedback voltage through an input pad 95 and transmits the received second common voltage into the display area DA through the contact hole 186. The second common voltage may be voltage for compensating for voltage drop or noise of the fed-back common voltage. As described above, the second common voltage as the compensated common voltage is directly applied to the inside of the display area DA, such that a difference between the common voltage of the common electrode 131 at the edge of the display area DA, which is close to the first common voltage transmitting line 77, and the common voltage of the common electrode 131 at the center of the display area DA may be substantially reduced or effectively prevented and the common voltage is thereby substantially uniformly transmitted through the common electrode 131.

In an exemplary embodiment, the common voltage feedback line 80 and the second common voltage transmitting line 90 may have various configurations to be connected to the center of the display area DA. In an exemplary embodiment, as shown in FIG. 26, the common voltage feedback line 80 may extend along a left or right edge and an upper edge of the display area DA from the output pad 85 and then extend to the center of the display area DA through the upper edge side of the display area DA. The second common voltage transmitting line 90 may extend to the center of the display area DA through the lower edge side of the display area DA from the input pad 95. In an alternative exemplary embodiment, the common voltage feedback line 80 and the second common voltage transmitting line 90 may pass through an edge side of the same side of the display area DA. However, the configurations of the common voltage feedback line 80 and the second common voltage transmitting line 90 may have various structures, not being limited to the structures described herein.

Hereinafter, exemplary embodiments of the display device including the common voltage feedback line 80 and the second common voltage transmitting line 90 will be described in detail.

Referring back to FIGS. 26, 27 and 28, in exemplary embodiments of the display device according the invention, a plurality of gate conductors including a plurality of gate lines 121a and 121b and a plurality of common voltage lines 125 are disposed on the insulation substrate 110. The gate lines 121a and 121b and the common voltage lines 125 may extend substantially in a horizontal direction. Each of the gate lines 121a and 121b may include a plurality of gate electrodes 124.

The gate conductor may further include first common voltage transmitting lines 77.

The gate insulating layer 140 is positioned on the gate conductors 121a, 121b and 125, and a plurality of semiconductors 154 is positioned on the gate insulating layer 140. The semiconductor 154 may be positioned on each gate electrode 124.

A plurality of data lines 171, a plurality of drain electrodes 175, and a data conductor including the common voltage feedback line 80 and the second common voltage transmitting line 90 are provided on the semiconductor 154.

The data lines 171 extend substantially in a vertical direction crossing the gate lines 121a and 121b and the common voltage lines 125, and each data line 171 may include a plurality of source electrodes (not shown) extending toward the gate electrodes 124.

The drain electrode 175 faces a portion of the data line 171 or the source electrode based on the gate electrode 124.

The gate electrode 124, the drain electrode 175, the data line 171 or the source electrode facing the drain electrode 175, and the semiconductor 154 collectively define a thin film transistor as a switching element.

In an exemplary embodiment, the common voltage feedback line 80 and the second common voltage transmitting line 90 are separated from each other and may extend substantially in a vertical direction and substantially parallel to the data line 171. The common voltage feedback line 80 may pass through substantially the center line of the display area DA through the upper edge side of the display area DA and then extend to the center of the display area DA. The second common voltage transmitting line 90 may pass through substantially the center line of the display area DA through the lower edge side of the display area DA and then extend to the center of the display area DA. In such an embodiment, the common voltage feedback line 80 and the second common voltage transmitting line 90 may be positioned along the same line in the display area DA.

The first passivation layer 180a is provided on the data conductor 171, 175, 80 and 90. The first passivation layer 180a includes two contact holes 186 exposing a portion of the common voltage feedback line 80 and a portion of the second common voltage transmitting line 90, respectively. The gate insulating layer 140 and the first passivation layer 180a include a plurality of contact holes 181 exposing the common voltage line 125 at a substantially constant interval therebetween.

The common electrode 131 may be positioned on the first passivation layer 180a. The common electrodes 131 positioned at the plurality of pixels may be connected to each other in substantially the entire of the display area DA. The common electrode 131 is electrically connected to the common voltage line 125 through the contact hole 181 and may receive the first common voltage from the common voltage line 125.

In such an embodiment, the common electrode 131 is electrically connected to the common voltage feedback line 80 and the second common voltage transmitting line 90 through the contact hole 186, respectively. The common electrode 131 may output common voltage of the common electrode 131 at the substantially center of the display area DA to the common voltage feedback line 80 and may receive the second common voltage compensated based on the feedback voltage from the second common voltage transmitting line 90. Accordingly, as shown in FIG. 26, in an exemplary embodiment where the first common voltage is received through the first common voltage transmitting line 77 surrounding at least three sides of the display area DA, the common voltage applied to the common electrode 131 may become substantially uniform in the entire of the display area DA by compensating dropping or noise of the common electrode 131 at the center of the display area DA, thereby effectively preventing display defects which may be generated due to non-uniformity of the common voltage.

The second passivation layer 180b is positioned on the common electrode 131. The second passivation layer 180b and the first passivation layer 180a may include a fourth contact hole 185 exposing the drain electrode 175.

The pixel electrode 191 is positioned on the second passivation layer 180b. The pixel electrode 191 is connected to the drain electrode 175 through the fourth contact hole 185 to receive the data voltage.

In an exemplary embodiment, the common voltage feedback line 80 and the second common voltage transmitting line 90 are disposed substantially parallel to the data line 171 and extend between the adjacent pixels PX, thereby effective preventing a loss of an aperture ratio.

Next, another alternative exemplary embodiment of a display device according to the invention will be described with reference to FIGS. 29, 30 and 31.

Figure 29:
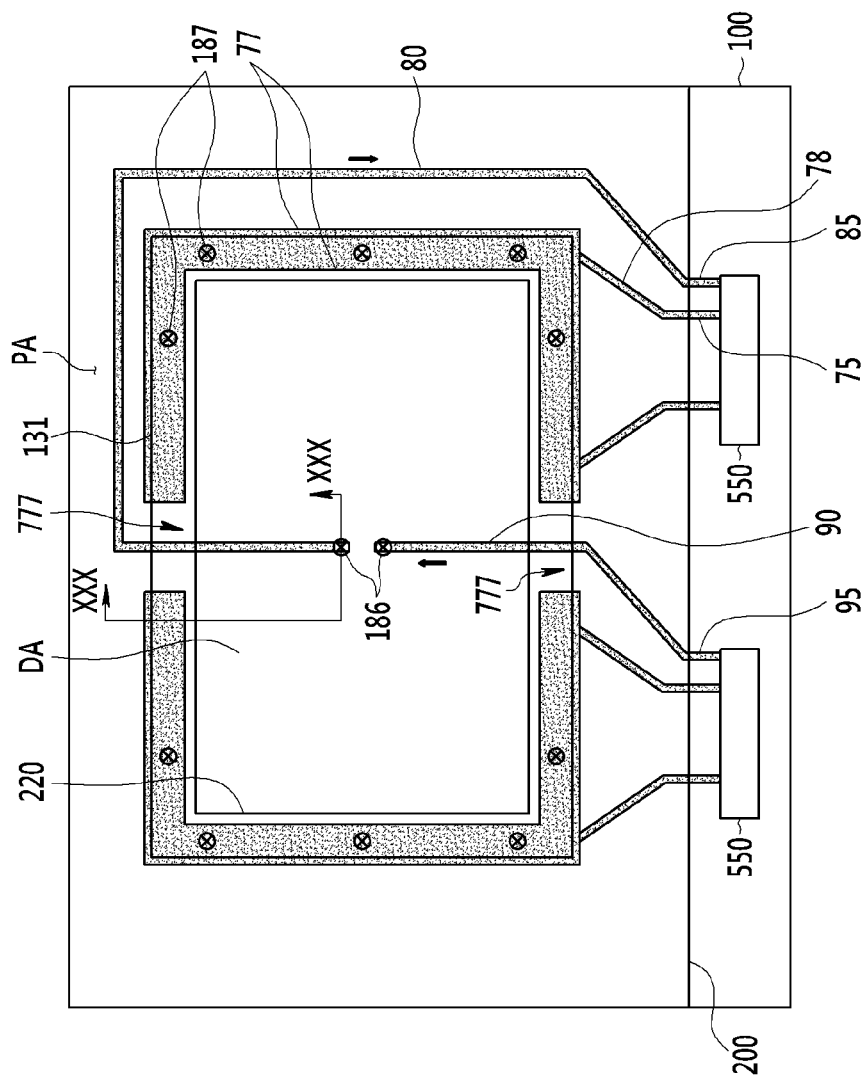
FIG. 29 is a block diagram showing another alternative exemplary embodiment of a display device according to the invention.
Figure 30:
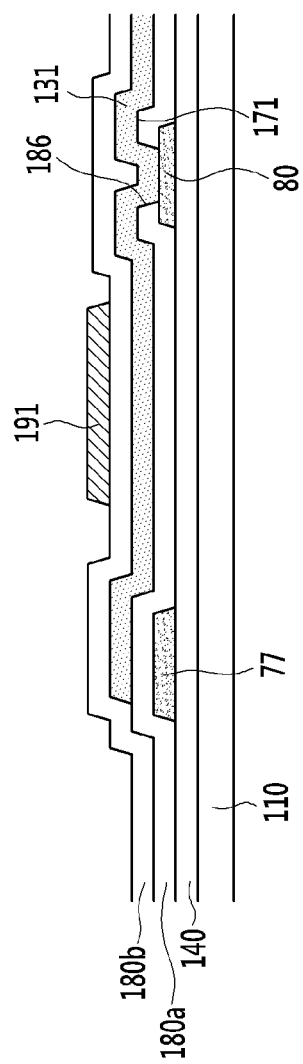
FIG. 30 is a cross-sectional view taken along line XXX-XXX of the display device of FIG. 29.
Figure 31:
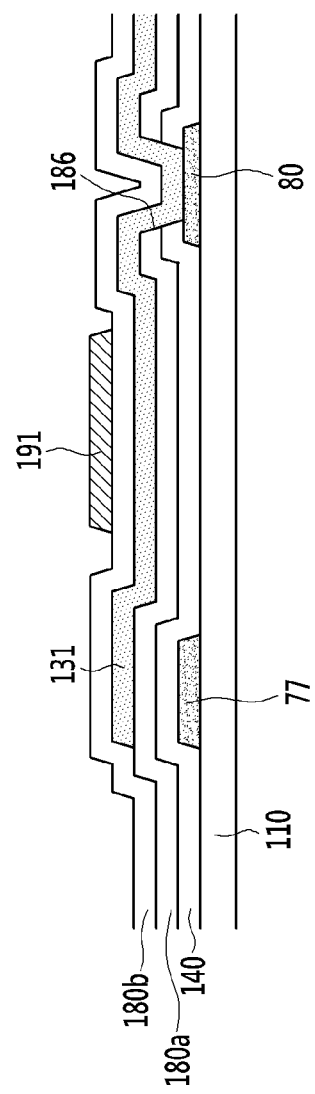
FIG. 31 is another cross-sectional view taken along line XXX-XXX of the display device of FIG. 29.

FIG. 29 is a block diagram showing an exemplary embodiment of a display device according to the invention, FIG. 30 is a cross-sectional view taken along line XXX-XXX of the display device of FIG. 29, and FIG. 31 is another cross-sectional view taken along line XXX-XXX of the display device of FIG. 29.

The display device shown in FIGS. 29 to 31 is substantially the same as the display device shown in FIGS. 26 to 28 described above, except for a structure of the first common voltage transmitting lines 77.

In an exemplary embodiment, the first common voltage transmitting line 77 may be divided into at least two portions with respect to at least two cutouts 777. In such an embodiment, as shown in FIG. 29, the cutouts 777 may be positioned at the upper and lower portions of the first common voltage transmitting line 77, respectively.

The common voltage feedback line 80 and the second common voltage transmitting line 90 may pass through the cutouts 777 of the first common voltage transmitting line 77 toward the center of the display area DA. In such an embodiment, the common voltage feedback line 80 and the second common voltage transmitting line 90 may be disposed in the same layer as the first common voltage transmitting line 77.

Referring to FIG. 30, in such an embodiment, a gate insulator is positioned on the insulation substrate 110, and the gate insulating layer 140 is positioned on the gate insulator. The gate insulator is substantially the same as the gate insulator in the exemplary embodiment shown in FIGS. 26 to 28 described above, and any repetitive detailed description thereof will be omitted.

In an exemplary embodiment, a data conductor including the first common voltage transmitting line 77, the common voltage feedback line 80 and the second common voltage transmitting line 90 is positioned on the gate insulating layer 140. As described above, the common voltage feedback line 80 and the second common voltage transmitting line 90 may pass through the cutouts 777 of the first common voltage transmitting line 77.

The first passivation layer 180a including a contact hole 186 is formed on the data conductor, and the common electrode 131 may be positioned on the first passivation layer 180a.

The second passivation layer 180b is positioned on the common electrode 131, and the pixel electrode 191 may be positioned on the second passivation layer 180b.

Referring to FIG. 31, in an exemplary embodiment, the first common voltage transmitting line 77, the common voltage feedback line 80 and the second common voltage transmitting line 90 may be positioned between the insulation substrate 110 and the gate insulating layer 140. In such an embodiment, a gate line (not shown) and a common voltage line (not shown) may be positioned in a layer from a layer in which the first common voltage transmitting line 77, the common voltage feedback line 80 and the second common voltage transmitting line 90 are disposed.

Next, another alternative exemplary embodiment of a display device according to the invention will be described with reference to FIGS. 32, 33 and 34.

Figure 32:
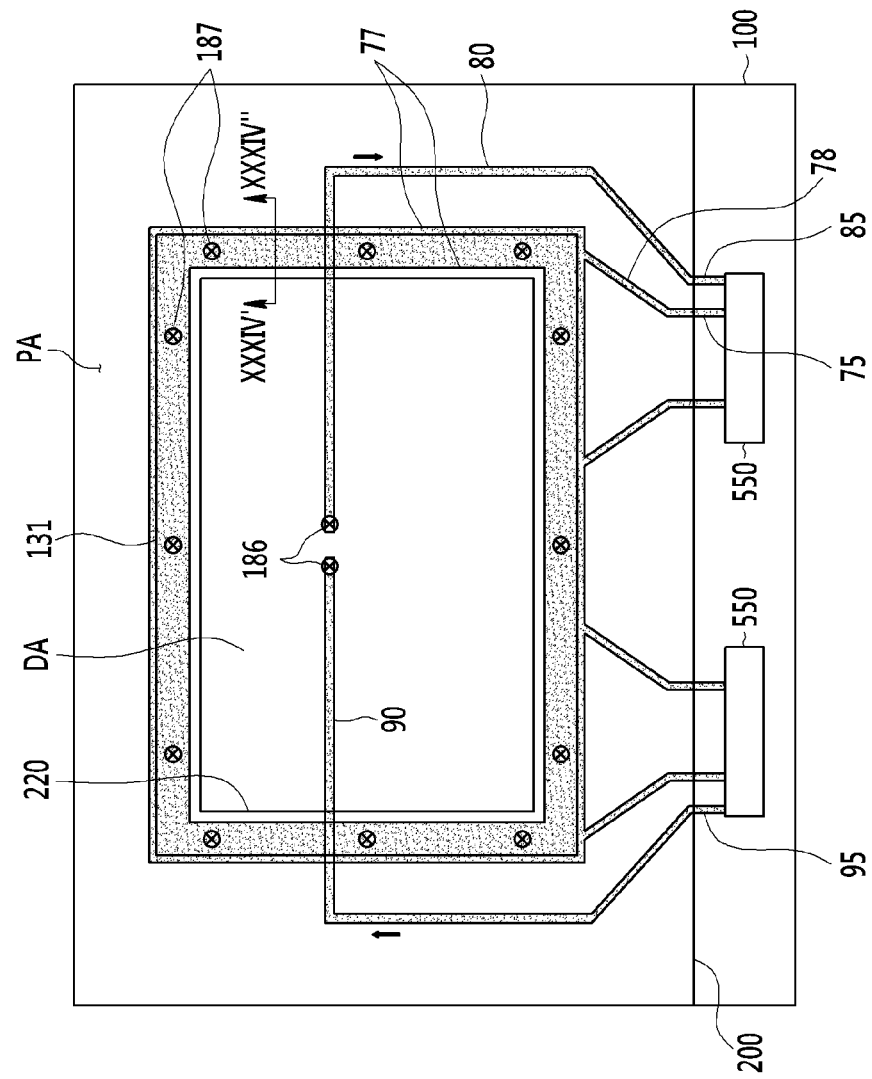
FIG. 32 is a block diagram showing another alternative exemplary embodiment of a display device according to the invention.
Figure 33:
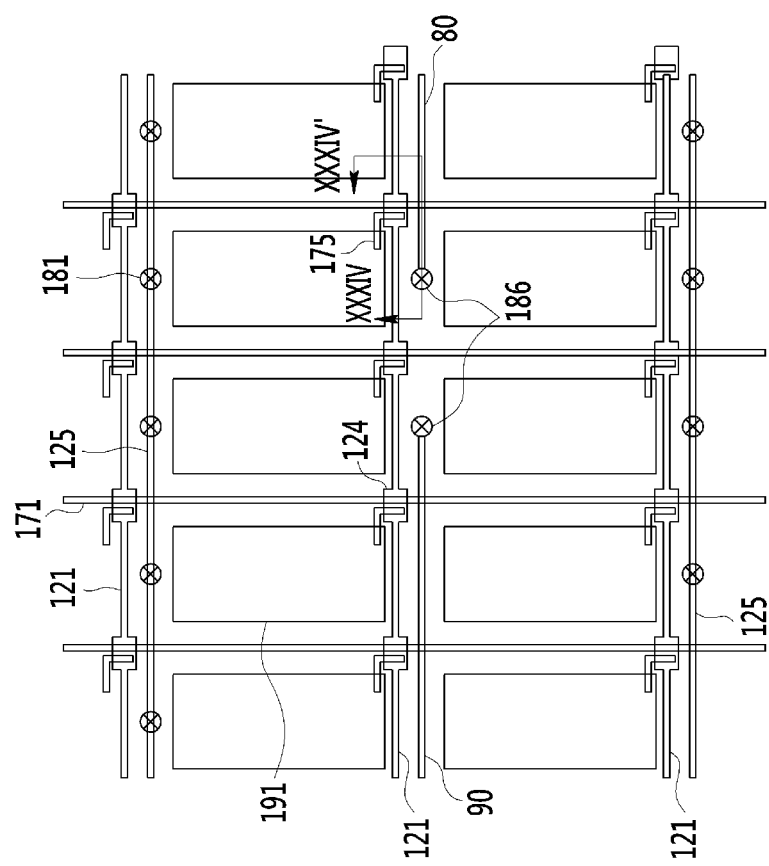
FIG. 33 is a block diagram showing another alternative exemplary embodiment of a display area of a display device according to an exemplary embodiment of the invention.
Figure 34:
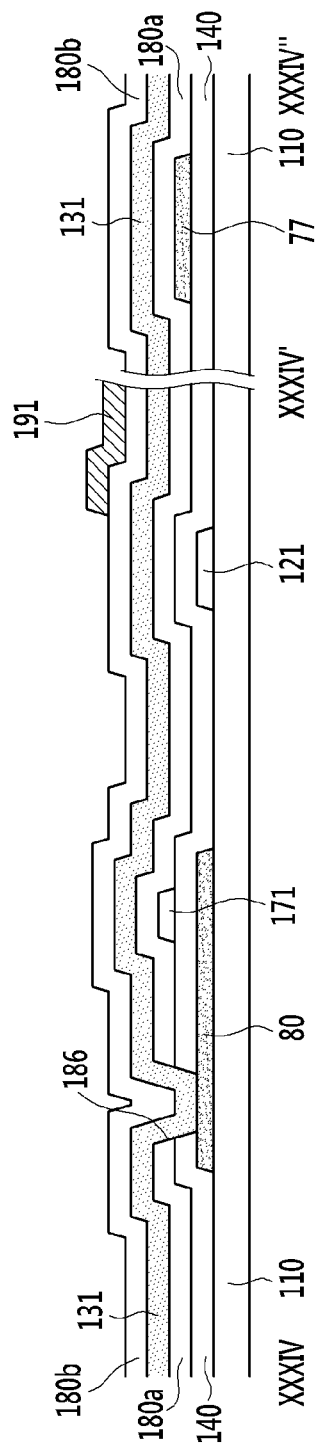
FIG. 34 is a cross-sectional view taken along line XXXIV-XXXIV' and line XXXIV'-XXXIV" of the display device of FIGS. 33 and 32.

FIG. 32 is a block diagram showing an exemplary embodiment of a display device according to the invention, FIG. 33 is a block diagram showing a display area of an exemplary embodiment of a display device according to the invention, and FIG. 34 is a cross-sectional view taken along lines XXXIV-XXXIV' and XXXIV'-XXXIV" of the display device of FIGS. 33 and 32.

The display device shown in FIGS. 32 to 34 is substantially the same as the display device shown in FIGS. 26 to 28 described above, except for structures of the common voltage feedback line 80 and the second common voltage transmitting line 90.

In such an embodiment, the common voltage feedback line 80 may extend along the right or left edge of the display area DA from an output pad 85, then pass through the right or left edge side of the display area DA, and further extend to the center of the display area DA. The second common voltage transmitting line 90 may extend along the right or left edge of the display area DA from an input pad 95, then pass through the right or left edge side of the display area DA, and further extend to the center of the display area DA.

Hereinafter, the exemplary embodiment shown in FIGS. 32 to 34 will be described in greater detail. The same or like elements shown in FIGS. 32 to 34 have been labeled with the same reference characters as used above to describe the exemplary embodiments of the display device shown in FIGS. 26 to 28, and any repetitive detailed description thereof will hereinafter be omitted or simplified.

Referring to FIGS. 32, 33 and 34, in an exemplary embodiment of the display device according to the invention, a plurality of gate conductors including a plurality of gate lines 121, a plurality of common voltage lines 125 and the common voltage feedback line 80, and the second common voltage transmitting line 90 are disposed on the insulation substrate 110.

The gate lines 121 and the common voltage lines 125 may extend substantially in a horizontal direction. The gate line 121 may include a plurality of gate electrodes 124.

In such an embodiment, the common voltage feedback line 80 and the second common voltage transmitting line 90 are separated from each other and extend substantially in a horizontal direction and substantially parallel to the gate line 121. The common voltage feedback line 80 may pass through substantially the center line of the display area DA through the right edge side of the display area DA and then further extend to the center of the display area DA. The second common voltage transmitting line 90 may pass through substantially the center line of the display area DA through the left edge side of the display area DA and then extend to the center of the display area DA. In such an embodiment, the common voltage feedback line 80 and the second common voltage transmitting line 90 may be positioned in the same line in the display area DA.

The gate insulating layer 140 is positioned on the gate conductors 121, 125, 80 and 90, and a plurality of semiconductors (not shown) is positioned on the gate insulating layer 140.

A data conductor including a plurality of data lines 171 and a plurality of drain electrodes 175 is disposed on the semiconductor 154.

The data lines 171 extend substantially in a vertical direction crossing the gate lines 121 and the common voltage lines 125, and each of the data lines 171 may include a plurality of source electrodes (not shown) extending toward the gate electrode 124.

The drain electrode 175 faces a portion of the data line 171 or the source electrode with respect to the gate electrode 124.

The data conductor may further include the first common voltage transmitting line 77.

The first passivation layer 180a is disposed on the data conductors 171 and 175. The first passivation layer 180a and the gate insulating layer 140 include two contact holes 186 exposing portions of the common voltage feedback line 80 and the second common voltage transmitting line 90, respectively, and include a plurality of contact holes 181 exposing the common voltage line 125 with regular intervals.

The common electrode 131 may be positioned on the first passivation layer 180a. The common electrode 131 may be electrically connected to the common voltage line 125 through a contact hole 181 and receive the first common voltage from the common voltage line 125.

The common electrode 131 may be electrically connected with the common voltage feedback line 80 and the second common voltage transmitting line 90 through the contact holes 186, respectively.

The second passivation layer 180b may be positioned on the common electrode 131, and the pixel electrode 191 may be positioned on the second passivation layer 180b. The pixel electrode 191 may be connected to the drain electrode 175 through contact holes (not shown) of the first passivation layer 180a and the second passivation layer 180b to receive data voltage.

In an exemplary embodiment, as shown in FIG. 32, the common voltage feedback line 80 and the second common voltage transmitting line 90 may be provided as the gate conductor, and the first common voltage transmitting line 77 may be provided as the data conductor such that the cutouts may not be formed at the first common voltage transmitting line 77. In such an embodiment, the common voltage feedback line 80 and the second common voltage transmitting line 90 are substantially parallel to the gate line 121 and pass between the adjacent pixels PX, thereby effectively preventing a loss of an aperture ratio.

In an alternative exemplary embodiment, the first common voltage transmitting line 77 may be provided as the gate conductor. In such an embodiment, the common voltage feedback line 80 and the second common voltage transmitting line 90 are provided as the gate conductor, as shown in FIG. 29 described above, cutouts (not shown) may be formed at the first common voltage transmitting line 77 and thus the common voltage feedback line 80 and the second common voltage transmitting line 90 may pass through the cutouts.

Next, another alternative exemplary embodiment of a display device according to the invention will be described in detail with reference to FIGS. 35, 36, 37, 38 and 39.

FIGS. 35, 36, 37, 38 and 39 are block diagrams showing exemplary embodiments of a display device according to the invention.

Figure 35:
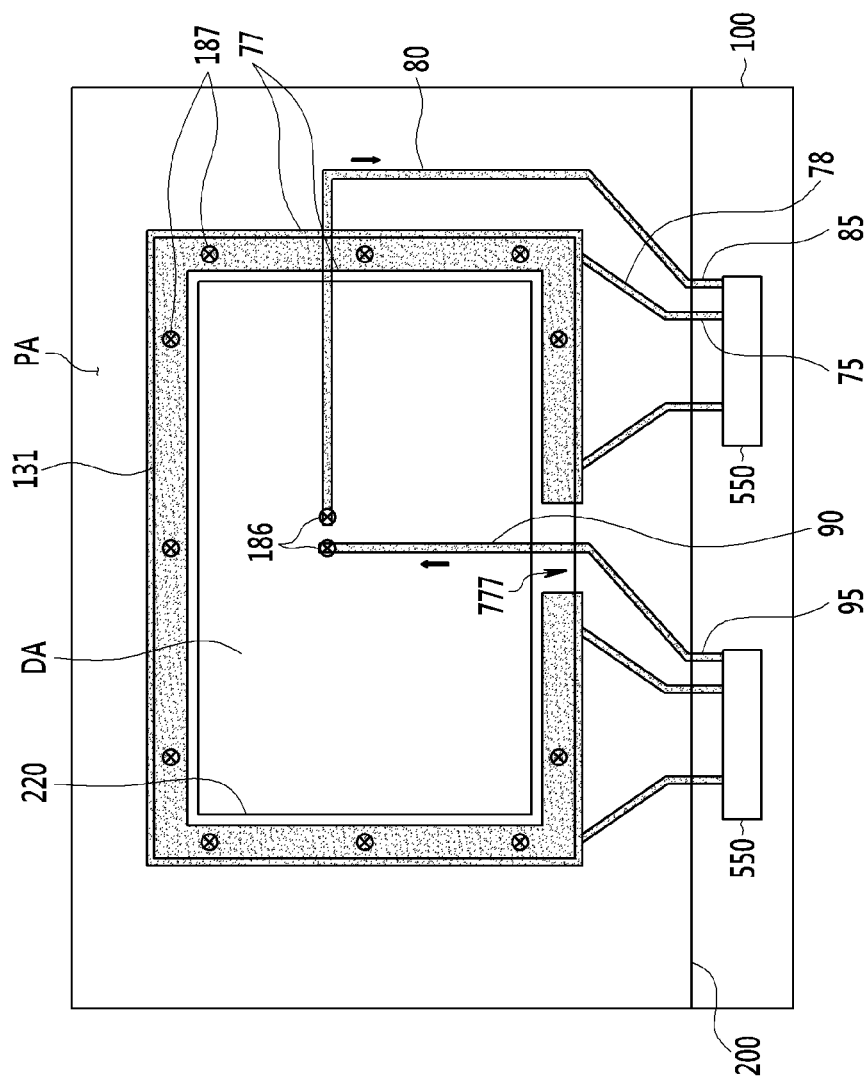

First, referring to FIG. 35, the display device shown in FIG. 35 is substantially the same as the exemplary embodiment shown in FIG. 29, except for a structure of the common voltage feedback line 80.

In such an embodiment, the common voltage feedback line 80 may extend along the right or left edge of the display area DA from the output pad 85 and then pass through the right or left edge side of the display area DA to extend to the center of the display area DA. The common voltage feedback line 80 may be disposed in a different layer from the first common voltage transmitting line 77, and the second common voltage transmitting line 90 may be disposed in the same layer as the first common voltage transmitting line 77. In one exemplary embodiment, for example, the second common voltage transmitting line 90 is provided as the gate conductor, and the first common voltage transmitting line 77 and the common voltage feedback line 80 may be provided as the data conductor.

Figure 36:
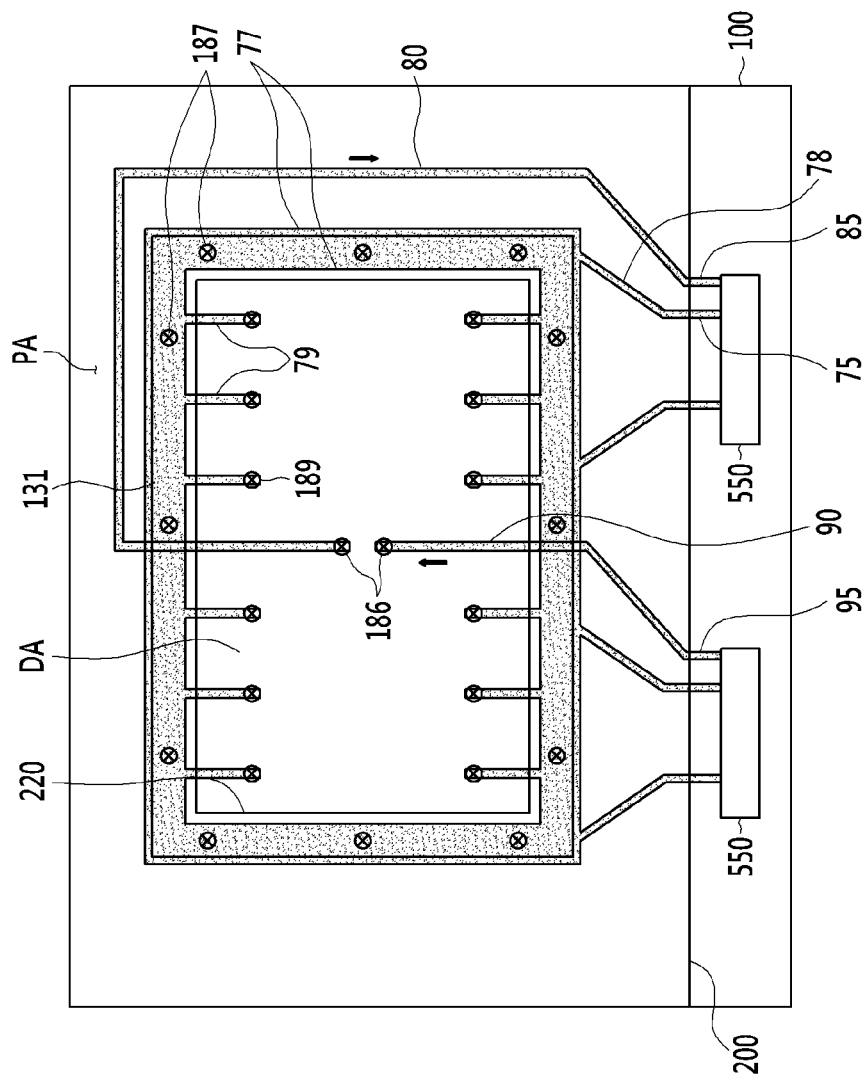
Figure 37:
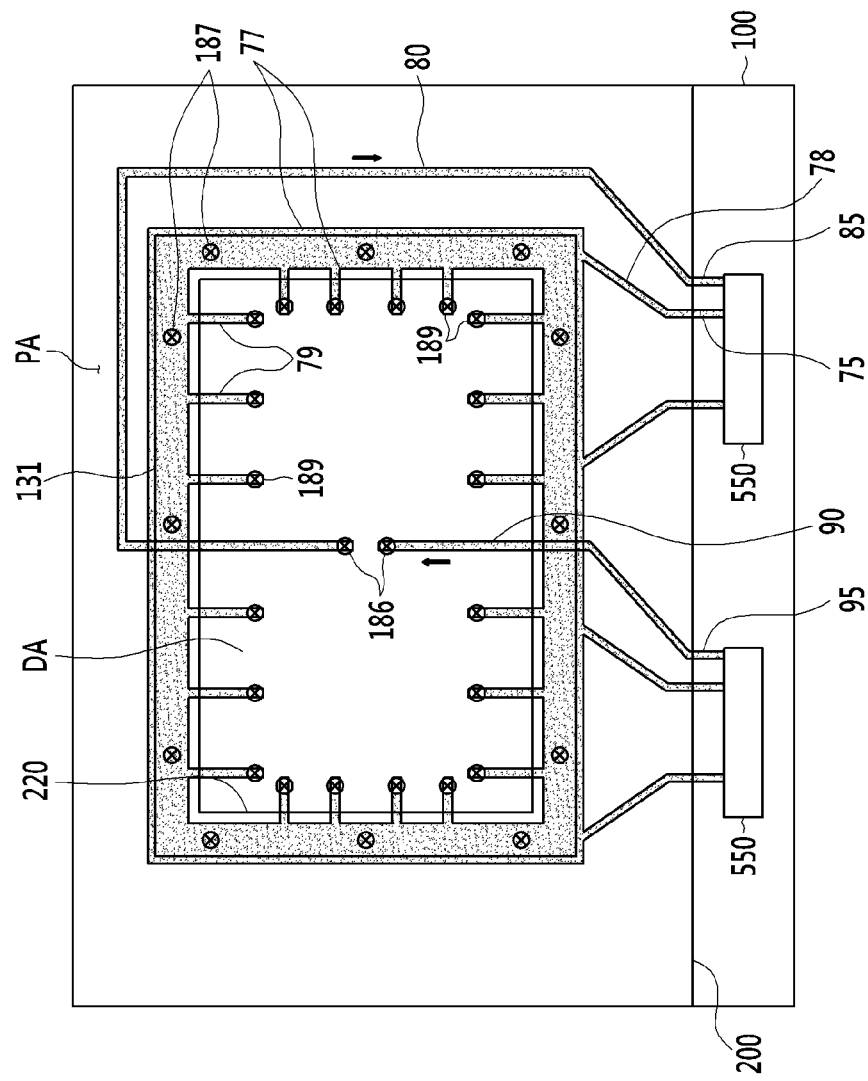

Next, referring to FIGS. 36 and 37, the display device shown in FIGS. 36 and 37 is substantially the same as the exemplary embodiment shown in FIG. 26, except for a structure of the first common voltage transmitting line 77.

In such an embodiment, the display device may further include at least one protrusion 79 extending into the display area DA from the first common voltage transmitting line 77. In an exemplary embodiment, the protrusion 79 may extend into the display area DA from the upper or lower portion of the first common voltage transmitting line 77, as shown in FIG. 36. In an alternative exemplary embodiment, the protrusion 79 may extend into the display area DA from all four sides of the first common voltage transmitting line 77, as shown in FIG. 37. In another alternative exemplary embodiment, the protrusion 79 may extend from the left or right portion of the first common voltage transmitting line 77.

The gate insulating layer 140 and the first passivation layer 180*a* may be positioned on the protrusion 79, as in the exemplary embodiment shown in FIG. 24 described above, and the insulating layer 140, the first passivation layer 180*a* and the second passivation layer 180*b* may be positioned on the protrusion 79, as in the exemplary embodiment shown in FIG. 25 described above. The insulating layer 140 and the first passivation layer 180*a* or the second passivation layer 180*b* may further include contact holes 189 exposing the protrusion 79.

Figure 38:
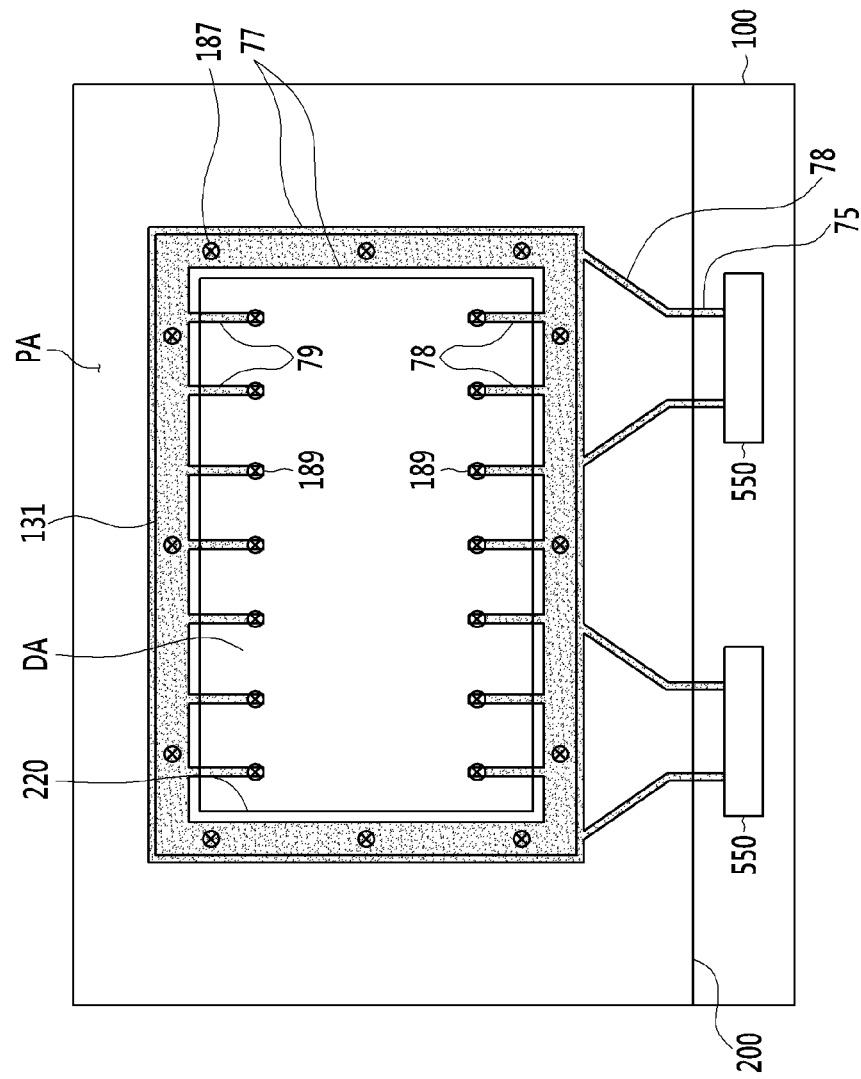

In an exemplary embodiment, as shown in FIGS. 36 to 38, the common electrode 131 may receive the first common voltage from the protrusion 79 connected with the first common voltage transmitting line 77 in the display area DA through the contact hole 189. In such an embodiment, a voltage level of the common voltage may become substantially uniform according to a position of the common electrode 131 in the display area DA. Herein, the contact holes 189 may correspond to common voltage input points together with the contact hole 187 exposing the first common voltage transmitting line 77.

In an exemplary embodiment, as shown in FIG. 38, the common voltage feedback line 80 and the second common voltage transmitting line 90 for compensating for non-uniformity of the common voltage according to a position of the common electrode 131 may be omitted.

Next, referring to FIG. 39, the display device shown in FIG. 39 is substantially the same as the exemplary embodiment shown in FIG. 26 except that a pair of second common voltage transmitting lines 90*a* and 90*b* are further included instead of the second common voltage transmitting line 90 connected to the common electrode 131 in the display area DA.

The second common voltage transmitting lines 90*a* and 90*b* extend along the left and right edges of the display area DA and the first common voltage transmitting line 77 toward the upper edge of the display area DA from input pads 95*a* and 95*b*, which are positioned in the peripheral area PA around the lower edge of the display area DA. Herein, the upper, lower, right and left directions are based on the display device shown in FIG. 39.

In an exemplary embodiment, the second common voltage transmitting line 90*a* may be connected to the first common voltage transmitting line 77 above a horizontal center line of the display area DA. In such an embodiment, the input pad 75 of the first common voltage transmitting line 77 is positioned below the horizontal center line of the display area DA. In an exemplary embodiment, as shown in FIG. 39, the second common voltage transmitting line 90*a* may be connected to the upper end of a first transmitting line 71*a*, which is the left portion of the first common voltage transmitting line 77, or a third transmitting line 71*c*, which is the upper portion of the first common voltage transmitting line 77, and the second common voltage transmitting line 90*b* may be connected to the upper end of a second transmitting line 71*b*, which is the right portion of the first common voltage transmitting line 77, or the third transmitting line 71*c*. In such an embodiment, the second common voltage transmitting lines 90*a* and 90*b* apply the second common voltage that compensates a deviation of the first common voltage due to the resistance of the first common voltage transmitting line 77 to the upper portion of the display area DA, which is distant from the input pad 75 of the first common voltage transmitting line 77, e.g., the upper ends of the first and second transmitting lines 71*a* and 71*b* of the first common voltage transmitting line 77 or the third transmitting line 71*c*, to thereby effectively prevent voltage from being changed according to a position of the common electrode 131 of the display area DA.

In an alternative exemplary embodiment, the second common voltage transmitting lines 90*a* and 90*b* may be positioned in a different layer from the first common voltage transmitting line 77. In such an embodiment, the second common voltage transmitting lines 90*a* and 90*b* and the first common voltage transmitting line 77 may be connected to each other by various connection methods. In one exemplary embodiment, for example, the second common voltage transmitting lines 90*a* and 90*b* and the first common voltage transmitting line 77 may be electrically connected to each other through a connecting member such as the connecting member 88, as shown in FIG. 23C and described above.

In an exemplary embodiment, one of the second common voltage transmitting lines 90*a* and 90*b* may be omitted.

Various features of the exemplary embodiment shown in FIG. 39 are substantially the same as corresponding features of the exemplary embodiments shown in FIGS. 1 to 3 and FIG. 26, described above. The exemplary embodiments of the invention as described herein may also be applied to other display devices having various structures. In one exemplary embodiment, for example, the common electrode 131 may be positioned under the data line 171 or below the gate electrode 124, and interlayer positions of other constituent elements may be properly changed therefrom.

Various features shown in FIGS. 1 to 38 and described herein may be implemented as an exemplary embodiment of the invention separately or in combination.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a first display panel comprising:
      a display area including a first edge, a second edge and a third edge, wherein the first and second edges are disposed opposite to each other, and the third edge is connected to the first and second edges;
      a peripheral area around the display area, the peripheral area defining boundaries of the first display panel; and
      a plurality of pixels disposed in the display area;
   a first common voltage transmitting line disposed in the peripheral area and extending at least substantially in the peripheral area along the third edge, wherein the first common voltage transmitting line transmits a first common voltage to the display area through a plurality of input points sequentially disposed along the third edge; and
   a second common voltage transmitting line disposed in the peripheral area and extending at least substantially in the peripheral area along the third edge, wherein the second common voltage transmitting line transmits a second common voltage to the display area through a supplementary input point, which is adjacent to the second edge or the third edge,
   wherein an input pad of the first common voltage transmitting line and an input pad of the second common voltage transmitting line are disposed in the peripheral area adjacent to the first edge and separated from each other, and
   the supplementary input point is closer to a last input point of the plurality of input points, which is closest to the second edge, than a first input point of the plurality of input points, which is closest to the first edge.

2. The display device of claim 1, further comprising:
   a common voltage feedback line extending along the third edge, wherein the common voltage feedback line receives a voltage of the last input point or a voltage of an end of the first common voltage transmitting line and transmits the received voltage to an output pad thereof as a feedback voltage.

3. The display device of claim 2, further comprising:
   a signal controller which generates the first common voltage and the second common voltage based on the feedback voltage.

4. The display device of claim 3, wherein
   the common voltage feedback line is connected to an end of the first common voltage transmitting line, which is disposed around the second edge.

5. The display device of claim 4, wherein
   a line width of the second common voltage transmitting line is larger than a line width of the first common voltage transmitting line.

6. The display device of claim 5, wherein
   a pixel of the plurality of pixels comprises:
      an insulation substrate;
      a common voltage line disposed on the insulation substrate;
      a common electrode connected to the common voltage line;
      a pixel electrode overlapping the common electrode; and
      an insulating layer interposed between the pixel electrode and the common electrode,
   wherein the first common voltage transmitting line is connected to at least one of the common voltage line and the common electrode through the plurality of input points.

7. The display device of claim 6, wherein
   the supplementary input point is disposed in the peripheral area adjacent to the third edge, and
   the first common voltage transmitting line and the second common voltage transmitting line are connected to each other at the supplementary input point.

8. The display device of claim 6, wherein
   the supplementary input point is substantially arranged with the last input point.

9. The display device of claim 6, wherein
   the second common voltage transmitting line transmits the second common voltage to the display area through a plurality of supplementary input points, which are adjacent to the second edge and arranged along the second edge.

10. The display device of claim 9, wherein
    the common voltage line extends in a direction substantially vertical to the second edge.

11. The display device of claim 1, wherein
    a line width of the second common voltage transmitting line is larger than a line width of the first common voltage transmitting line.

12. The display device of claim 1, wherein
    the supplementary input point is disposed in the peripheral area adjacent to the third edge, and
    the first common voltage transmitting line and the second common voltage transmitting line are connected to each other at the supplementary input point.

13. The display device of claim 12, wherein
    the supplementary input point is substantially arranged with the last input point.

14. The display device of claim 1, wherein
    the second common voltage transmitting line transmits the second common voltage to the display area through a plurality of supplementary input points which are adjacent to the second edge and arranged along the second edge.

15. The display device of claim 1, wherein
    a pixel of the plurality of pixels comprises:
       an insulation substrate,
       a common voltage line disposed on the insulation substrate,
       a common electrode connected to the common voltage line;
       a pixel electrode overlapping the common electrode; and
       an insulating layer interposed between the pixel electrode and the common electrode,
    wherein the first common voltage transmitting line is connected to at least one of the common voltage line and the common electrode through the plurality of input points.

16. The display device of claim 15, wherein
    the common voltage line extends in a direction substantially vertical to the second edge.

17. The display device of claim 15, wherein
    the first common voltage transmitting line and the second common voltage transmitting line are disposed in different layers.

18. The display device of claim 17, further comprising:
    a second display panel disposed opposite to the first display panel; and a liquid crystal layer interposed between the first display panel and the second display panel, wherein the common electrode is disposed between the pixel electrode and the liquid crystal layer, the common electrode comprises a plurality of branch electrodes overlapping the pixel electrode, and the first common voltage transmitting line and the second common voltage transmitting line are connected to each other through a contact assistant disposed in a layer, in which the common electrode is disposed.

19. The display device of claim 17, further comprising:

a second display panel disposed opposite to the first display panel; and a liquid crystal layer interposed between the first display panel and the second display panel, wherein the pixel electrode is disposed between the common electrode and the liquid crystal layer, the pixel electrode comprises a plurality of branch electrodes overlapping the common electrode, and the first common voltage transmitting line and the second common voltage transmitting line are connected to each other through a contact assistant disposed in a layer, in which the pixel electrode is disposed.

20. The display device of claim 1, further comprising:

a plurality of gate lines disposed in the display area; and a gate driver which transmits gate signals to the plurality of gate lines, wherein the first common voltage transmitting line and the second common voltage transmitting line are disposed in a different layer from the gate line.

21. A display device comprising:

a first substrate comprising a display area and a peripheral area around the display area;

a plurality of pixel electrodes disposed in the display area;

a common electrode disposed in the display area;

a first common voltage transmitting line extending along at least three edges of the display area at least substantially in the peripheral area defining boundaries of the first substrate, the at least three edges extend in different directions from each other;

an insulating layer disposed between the first common voltage transmitting line and the common electrode, the insulating layer including a plurality of contact holes which are disposed along the at least three edges;

a second common voltage transmitting line extending along the first common voltage transmitting line in the peripheral area, wherein the second common voltage transmitting line transmits a second common voltage, which compensates a deviation of the first common voltage according to a position in the common electrode, to the first common voltage transmitting line, wherein the first common voltage transmitting line transmits a first common voltage to the common electrode through the plurality of contact holes, and wherein an input pad of the first common voltage transmitting line is disposed in a first side with respect to a horizontal center line of the display area, the second common voltage transmitting line is connected to a portion of the first common voltage transmitting line, which is disposed in a second side opposite to the first side with respect to the horizontal center line.

\* \* \* \* \*